(12) United States Patent
Sakamoto et al.

(10) Patent No.: US 10,942,631 B2
(45) Date of Patent: Mar. 9, 2021

(54) CONTENT DELIVERY SYSTEM, CONTENT RECEPTION APPARATUS, AND CONTENT DELIVERY METHOD

(71) Applicant: Sharp Kabushiki Kaisha, Sakai (JP)

(72) Inventors: Kiho Sakamoto, Sakai (JP); Hiroki Munetomo, Sakai (JP); Noriyuki Koyama, Sakai (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 0 days.

(21) Appl. No.: 16/009,306

(22) Filed: Jun. 15, 2018

(65) Prior Publication Data

US 2018/0364896 A1    Dec. 20, 2018

(30) Foreign Application Priority Data

Jun. 20, 2017    (JP) .............................. JP2017-120699

(51) Int. Cl.
*G06F 3/0484*    (2013.01)
*H04L 29/08*    (2006.01)
(Continued)

(52) U.S. Cl.
CPC ........ *G06F 3/04845* (2013.01); *G06F 3/0488* (2013.01); *G06F 3/04817* (2013.01);
(Continued)

(58) Field of Classification Search
CPC .. G06F 3/04845; G06F 3/04817; G06F 16/16; G06F 3/0488; G06F 3/04842;
(Continued)

(56) References Cited

U.S. PATENT DOCUMENTS 5,745,711 A  *  4/1998  Kitahara ............. G06F 3/04842
                                                   715/753
5,751,287 A  *  5/1998  Hahn .................... G06F 3/0481
                                                   715/775
(Continued)

FOREIGN PATENT DOCUMENTS

CN          102486716 A      6/2012
CN          104041012 A      9/2014
(Continued)

OTHER PUBLICATIONS

"Instruction manual of Mac OS X you should know, Theme of the month, Data passing", Mac Fan, vol. 20 No. 9, Sep. 1, 2012, 7 pages.

*Primary Examiner* — Andrey Belousov
(74) *Attorney, Agent, or Firm* — Keating & Bennett, LLP

(57) ABSTRACT

A content transmission apparatus displays, on the display screen, an image created based on content. The content transmission apparatus detects a move operation on a selected image. The content transmission apparatus determines whether or not the selected image has been moved to a predetermined transmission-side specified area on the display screen. When the selected image has been moved to the transmission-side specified area, the content transmission apparatus changes the display form of the image, and transmits the content corresponding to the selected image, to a storage area associated with the transmission-side specified area. A content reception apparatus obtains the content from the storage area for display.

11 Claims, 19 Drawing Sheets

(51) Int. Cl.
*G06F 3/0481* (2013.01)
*G06F 3/0488* (2013.01)
*G06F 16/16* (2019.01)
*H04L 29/06* (2006.01)

(52) U.S. Cl.
CPC .......... *G06F 3/04842* (2013.01); *G06F 16/16* (2019.01); *H04L 67/141* (2013.01); *H04L 67/42* (2013.01)

(58) Field of Classification Search
CPC .. G06F 3/04883; G06F 3/0486; G06F 3/0485; H04L 67/141; H04L 67/42; H04L 67/06
USPC .................................................. 715/769, 843
See application file for complete search history.

(56) References Cited

U.S. PATENT DOCUMENTS

| | | | |
|---|---|---|---|
| 7,710,490 | B2 | 5/2010 | Hara et al. |
| 8,675,024 | B2 | 3/2014 | Hwang et al. |
| 2011/0083111 | A1* | 4/2011 | Forutanpour ........... G06F 3/017 715/863 |
| 2012/0139951 | A1 | 6/2012 | Hwang et al. |
| 2013/0227015 | A1 | 8/2013 | Mihara et al. |
| 2014/0019874 | A1* | 1/2014 | Li .......................... H04L 67/06 715/748 |
| 2014/0068469 | A1 | 3/2014 | Lee |
| 2014/0361968 | A1 | 12/2014 | Kondo |

FOREIGN PATENT DOCUMENTS

| | | |
|---|---|---|
| JP | 2007-235449 A | 9/2007 |
| JP | 2007-241679 A | 9/2007 |
| JP | 2013-003742 A | 1/2013 |
| JP | 2013-175059 A | 9/2013 |
| JP | 2014-135578 A | 7/2014 |

* cited by examiner

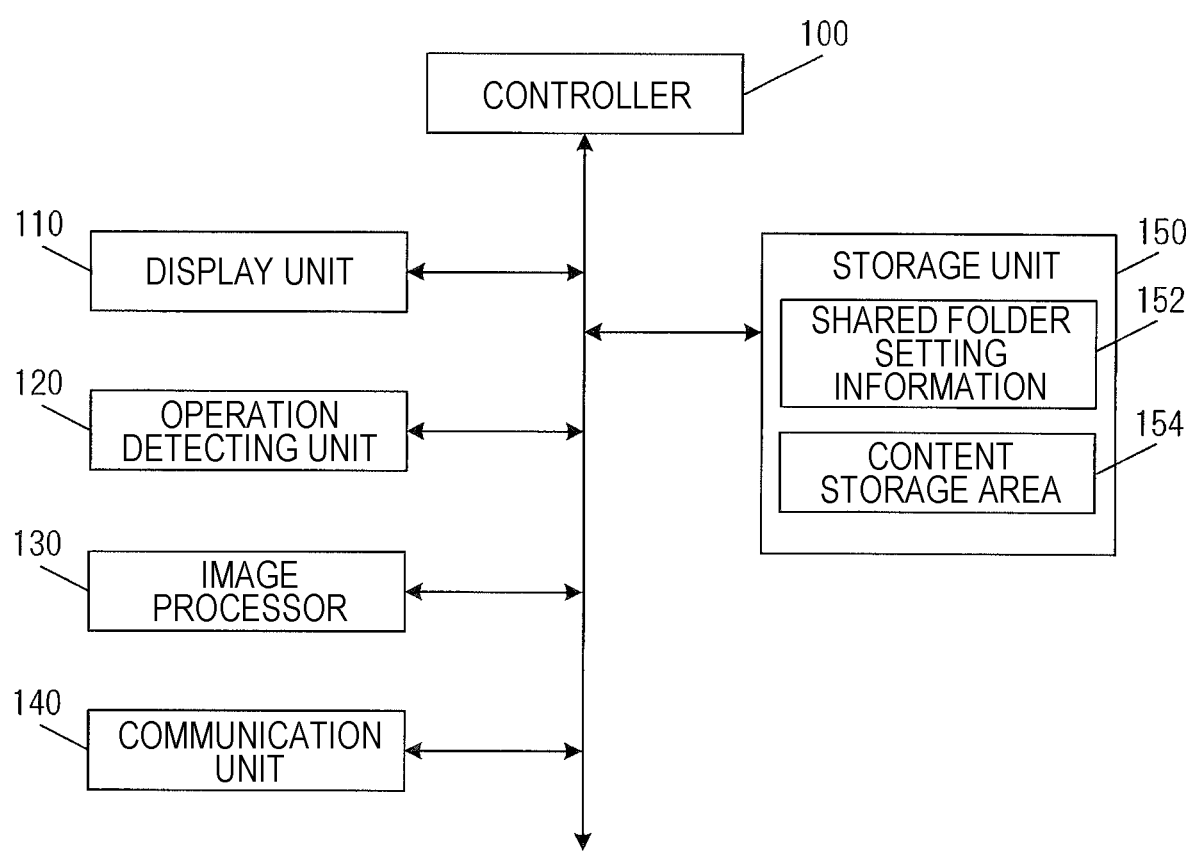

| TUNNEL TRAY | SHARED FOLDER INFORMATION |
|---|---|
| TUNNEL TRAY A | \\server1\fd1\ |
| TUNNEL TRAY B | \\server1\fd2\ |

CONTENT DELIVERY SYSTEM, CONTENT RECEPTION APPARATUS, AND CONTENT DELIVERY METHOD

BACKGROUND

1. Field

The present disclosure relates to a content delivery system and the like.

2. Description of the Related Art

Heretofore, a technique has been known in which various types of data are delivered between multiple apparatuses. For example, the following disclosure has been disclosed (for example, see Japanese Unexamined Patent Application Publication No. 2013-3742). A display unit displays an icon, which represents data, so that the icon may be moved in accordance with a user's touch operation. At the same time, the display unit displays, around the icon, pieces of apparatus specification information representing apparatuses to which the data may be transmitted. When a user has moved, using a touch operation, the icon that is displayed by the display unit, a touch sensor unit detects the direction in which the user has moved the icon. An apparatus-specification-information detecting unit detects apparatus specification information displayed in the direction detected by the touch sensor unit. A data reception/transmission controller controls transmission of the data to the apparatus indicated by the apparatus specification information detected by the apparatus-specification-information detecting unit.

The following disclosure has been disclosed (for example, see Japanese Unexamined Patent Application Publication No. 2014-135578). When an image management application is activated on the home screen, an image management screen is displayed on the display. On the image management screen, thumbnail icons corresponding to image data are displayed. When a user selects any thumbnail icon, share transmission icons (SH) are displayed based on data about addresses for which share transmission is enabled. In this state, the user flicks the selected thumbnail icon toward a share transmission icon, the image data corresponding to the thumbnail icon is transmitted based on the address data corresponding to the share transmission icon.

However, Japanese Unexamined Patent Application Publication No. 2013-3742 described above discloses a technique of detecting a peripheral in a short distance and transmitting data to the peripheral. In the disclosure, a peripheral has to be detected, failing to achieve an easy operation of transmitting content.

In Japanese Unexamined Patent Application Publication No. 2014-135578 described above, it is assumed that mail or the like is used as a transmission mechanism. For example, in transmission of displayed content to a different apparatus, a user may feel the usability is not good.

A data delivery mechanism of the related art has difficulty in that a user does not easily recognize whether or not content has been transmitted on the transmission side.

SUMMARY

The present disclosure provides a content delivery system and the like which achieve a user's visual recognition of operations of receiving/transmitting content from/to a different apparatus, and also achieve high user operability.

A content delivery system provided by the present disclosure is a system to which a content transmission apparatus and a content reception apparatus are connected. The content transmission apparatus includes a transmission-side display unit, an image selection unit, an operation detection unit, a move determination unit, an image changing unit, and a content transmission unit. The transmission-side display unit displays an image on a display screen. The image is created based on content. The image selection unit selects a selected image from the image. The operation detection unit detects a move operation on the selected image. The move determination unit determines whether or not the selected image has been moved to a predetermined transmission-side specified area on the display screen. The image changing unit changes a display form of the selected image when the selected image has been moved to the transmission-side specified area. The content transmission unit transmits content to a storage area associated with the transmission-side specified area. The content corresponds to the selected image whose display form has been changed. The content reception apparatus includes a content acquisition unit and a reception-side display unit. The content acquisition unit acquires the content from the storage area. The reception-side display unit displays an image on a display screen of the content reception apparatus. The image is created based on the acquired content.

A content delivery method provided by the present disclosure is a method for a content delivery system to which a content transmission apparatus and a content reception apparatus are connected. The method includes, by using the content transmission apparatus, displaying an image on a display screen, the image being created based on content; selecting a selected image from the image; detecting a move operation on the selected image; determining whether or not the selected image has been moved to a predetermined transmission-side specified area on the display screen; changing a display form of the selected image when the selected image has been moved to the transmission-side specified area; transmitting content to a storage area associated with the transmission-side specified area, the content corresponding to the selected image whose display form has been changed; by using the content reception apparatus, acquiring the content from the storage area; and displaying an image on a display screen of the content reception apparatus, the image being created based on the acquired content.

BRIEF DESCRIPTION OF THE DRAWINGS

FIG. 2 is a diagram for describing the functional configuration of a display apparatus according to the first embodiment;

DESCRIPTION OF THE EMBODIMENTS

Figure 1A:
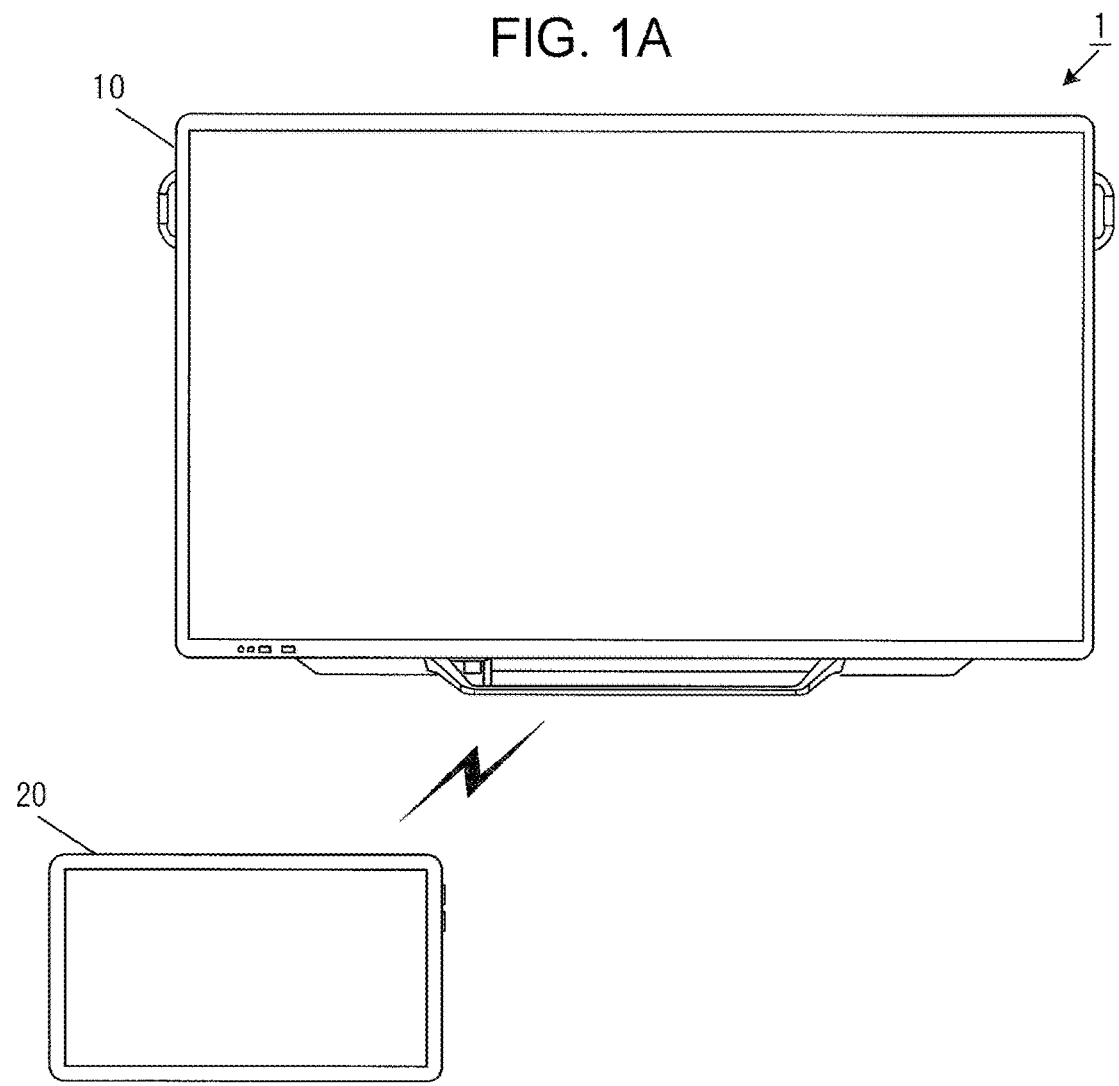
FIGS. 1A and 1B are diagrams for describing the appearance of the entire system according to a first embodiment.

Embodiments for embodying the present disclosure will be described below by referring to the drawings. For the sake of convenience of explanation, the embodiments will be described by taking, as an example, the case in which the display apparatus provided by the present disclosure is applied to a display apparatus integral with a touch panel. However, as a matter of course, as long as a display apparatus on which objects may be drawn or disposed through a user's operation input is employed, any apparatus may be applied.

First Embodiment

Overall Configuration

Figure 1B:
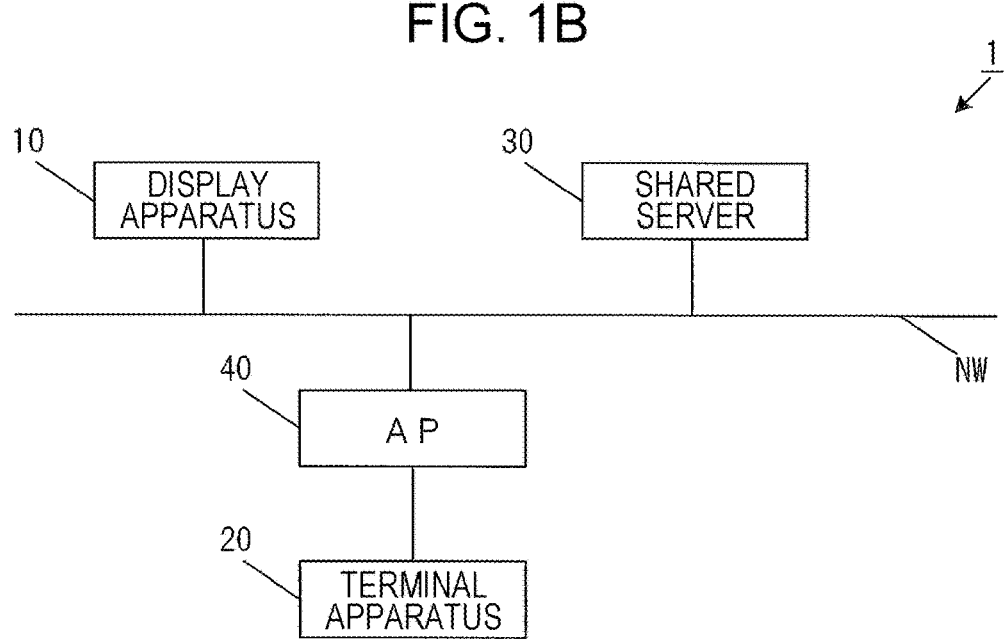

FIGS. 1A and 1B illustrate a content delivery system 1 including the display apparatus provided by the present disclosure. FIG. 1A is a diagram illustrating the overview of the appearance. The content delivery system 1 includes at least a display apparatus 10 and a terminal apparatus 20.

The display apparatus 10 according to the first embodiment is assumed to be a large display apparatus. Examples of the display apparatus 10 include an electronic whiteboard (interactive whiteboard (IWB)), a large television set, and a table-type display device. In the first embodiment, it is assumed that a display apparatus, for example, using a liquid crystal display (LCD) is used. However, for example, an irradiation-type apparatus such as a projector may be used.

The terminal apparatus 20 according to the first embodiment is assumed to be a small display apparatus. For example, it is assumed that a tablet information terminal apparatus, a smartphone, or a computer, which is used, for example, by a meeting participant or a student, is used.

The first embodiment describes the display apparatus 10 and the terminal apparatus 20. That is, as long as a slave (the terminal apparatus 20 according to the first embodiment) is connected to a master (the display apparatus 10 according to the first embodiment), any relationship may be employed. A user sets a master-slave relationship. The relationship is set appropriately depending on the usage case.

FIG. 1B describes the configuration of the content delivery system 1. The display apparatus 10 is connected to a network NW. The terminal apparatus 20 is also connected to the network NW, and is capable of communicating with the display apparatus 10 over the network NW. In the first embodiment, the terminal apparatus 20 is connected to the network NW via an access point (AP) 40 connected to the network NW.

In the first embodiment, a shared server 30 is connected to the network NW, and is capable of communicating with the display apparatus 10 and the terminal apparatus 20. In the first embodiment, content is shared through a shared folder that is set in the shared server 30. Alternatively, a shared folder may be set in the display apparatus 10 or the terminal apparatus 20, or may be set in a cloud server when an external cloud server is used.

A description will be made under the assumption that the display apparatus 10 and the terminal apparatus 20 according to the first embodiment include touch panels which may receive touch input.

A touch panel may receive operation input, such as a touch, a flick, and a swipe, from a user. The type of touch panel of detecting a touch and the like may be a capacitive type or a pressure-sensitive type. That is, as long as the apparatus is capable of receiving a user's operation input such as a touch appropriately, any apparatus may be used.

A touch may be performed by using a user's finger or a pen. In the case of use of a pen, the user of the pen may be identified, for example, by using unique identification information (for example, the serial number or the MAC address) with which the pen may be identified.

In the first embodiment, a system which facilitates transfer or delivery of content between the terminal apparatus 20 and the display apparatus 10 is described. The content indicates various types of data that may be used in the display apparatus 10 and the terminal apparatus 20. The content includes data, such as a still-image file (still-image data, such as Joint Photographic Experts Group (JPEG), Graphic Interchange Format (GIF), or portable network graphics GIF (PNG)), a document file (for example, a text file, a document file using word processing/spread sheet/presentation software, or a Portable Document Format (PDF) file), a moving image file (for example, moving image data of the audio video interleaved (avi) format or the moving picture experts group (MPEG) format), and an audio file (for example, the audio data of the MPEG-1 Audio Layer 3 (mp3) format or the wav format).

Functional Configuration

The functional configuration of each apparatus according to the first embodiment will be described.

Display Apparatus

The functional configuration of the display apparatus 10 will be described by using FIG. 2. As illustrated in FIG. 2, the display apparatus 10 includes a controller 100, a display unit 110, an operation detecting unit 120, an image processor 130, a communication unit 140, and a storage unit 150.

The controller 100 is a functional unit for controlling the entire display apparatus 10. The controller 100 reads and executes various programs stored in the storage unit 150, so as to implement various functions. The controller 100 includes, for example, a central processing unit (CPU).

The controller 100 controls display of objects such as images which are drawn and input through a display screen (the operation detecting unit 120), for example, in the case where the display apparatus 10 includes a touch panel. The controller 100 also controls display of images received from other image input apparatuses.

The display unit 110 is a functional unit for displaying various types of information to a user and for displaying a sheet on which objects are drawn and disposed. The display unit 110 includes, for example, a liquid crystal display (LCD) or an organic electroluminescent (EL) display. Alternatively, the display unit 110 may be an irradiation-type/projection-type display control apparatus such as a projector.

The operation detecting unit 120 is a functional unit for detecting a user's operation. For example, the operation detecting unit 120 includes a touch panel integral with the display unit 110. The operation detecting unit 120 may employ any method for detecting an operation, for example, a capacitive type, a pressure-sensitive type such as a resistance film type, an infrared radiation type, or an electromagnetic induction type.

In the case where the display unit 110 is a display control apparatus of the irradiation type or the like, a person detecting sensor or the like may be used as the operation detecting unit 120 to detect an operation.

The image processor 130 is a functional unit for processing various types of images. That is, when content is to be displayed on the display unit 110, the image processor 130 performs various types of processing. For example, a still image is enlarged or reduced in size for display as content, or a moving image is played as content.

In addition, the image processor 130 creates, from content, a sheet which serves as a thumbnail image, and performs various types of image processing, such as a color adjustment process and a sharpening process, on content.

The communication unit 140 is a network interface for connection to the network NW. The communication method may be wired/wireless and a local area network (LAN)/wide area network (WAN). That is, in the first embodiment, as long as the communication unit 140 communicates with the terminal apparatus 20 and the shared server 30, any configuration may be employed. In the case of a wired LAN, an Ethernet® standard, such as 10BASE-T, 100BASE-TX, or 1000BASE-T, is used. In the case of a wireless LAN, a standard such as IEEE802.11a/b/g/n is used. In the case of a WAN, Long Term Evolution (LTE), worldwide interoperability for microwave access (WiMAX), 3rd generation (3G), or the like is used.

In the case where the shared server 30 is not used and where the communication unit 140 directly communicates with the terminal apparatus 20, near field communication, such as Bluetooth® or ZigBee, may be used.

The storage unit 150 is a functional unit that stores various programs used in operations performed by the display apparatus 10 and that stores various data. The storage unit 150 includes, for example, a semiconductor memory such as a solid state drive (SSD) and a magnetic disk such as a hard disk drive (HDD).

The storage unit 150 stores shared folder setting information 152. In the storage unit 150, a content storage area 154 is allocated.

The shared folder setting information 152 stores settings of a shared folder which serves as an exemplary storage area for sharing content with other apparatuses such as the terminal apparatus 20. For example, in the case where "\\Server\share\user1" is stored, the specified folder (directory) is set as the shared folder.

The storage area for sharing content may be a shared folder in a server or an apparatus, or may be, for example, information about an external file service (for example, account information of a cloud service). The storage area is not limited to a folder. As long as it is a storage area, such as a drive, an apparatus, or a storage medium, through which files and the like may be shared, any configuration may be employed.

The content storage area 154 stores content. Content created or edited on the display apparatus 10 and content received from other apparatuses are stored.

Terminal Apparatus

Figure 3:
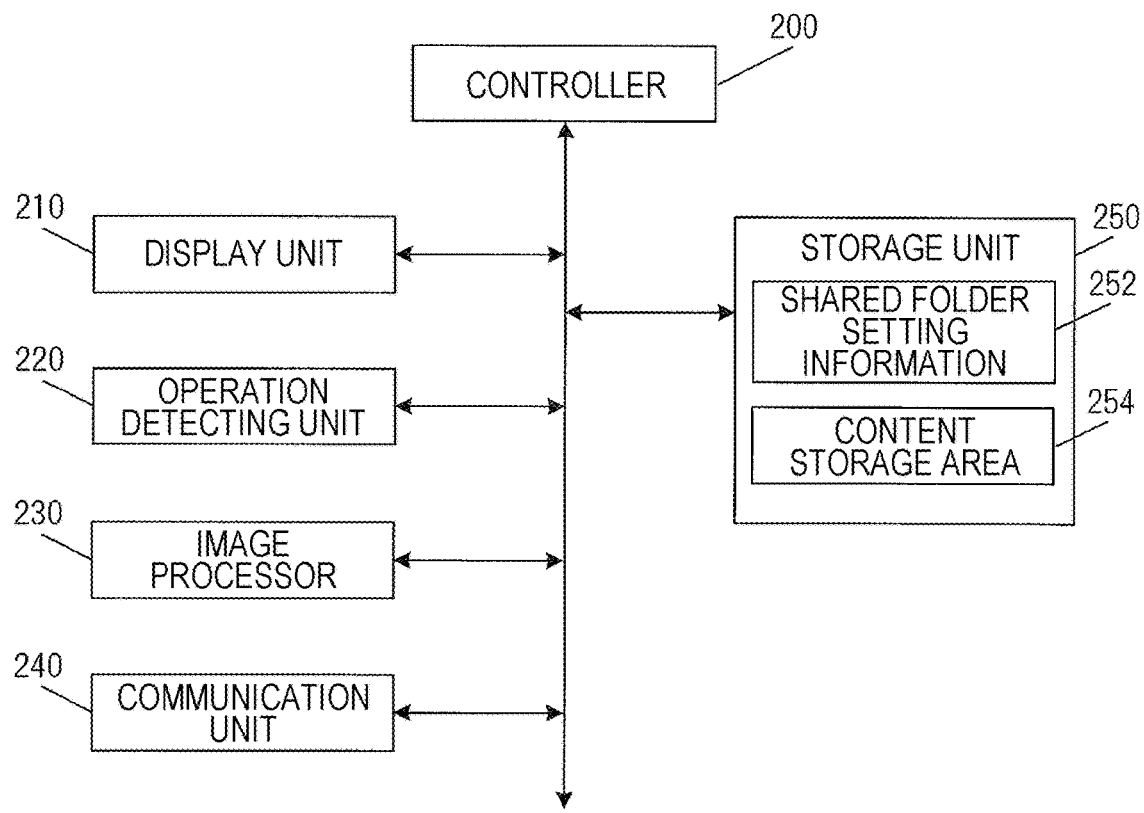
FIG. 3 is a diagram for describing the functional configuration of a terminal apparatus according to the first embodiment.

The functional configuration of the terminal apparatus 20 will be described by using FIG. 3. As illustrated in FIG. 3, the terminal apparatus 20 includes a controller 200, a display unit 210, an operation detecting unit 220, an image processor 230, a communication unit 240, and a storage unit 250.

The controller 200 is a functional unit for controlling the entire terminal apparatus 20. The controller 200 reads and executes various programs stored in the storage unit 250, so as to implement various functions. The controller 200 includes, for example, a CPU.

The controller 200 controls display of objects such as images which are drawn and input through a display screen (the operation detecting unit 220), for example, in the case where the terminal apparatus 20 includes a touch panel. The controller 200 also controls display of images received from other image input apparatuses.

The display unit 210 is a functional unit for displaying various types of information to a user and for displaying a sheet on which objects are drawn and disposed. The display unit 210 includes, for example, an LCD or an organic EL display. Alternatively, the display unit 210 may be an irradiation-type/projection-type display control apparatus such as a projector.

The operation detecting unit 220 is a functional unit for detecting a user's operation. For example, the operation detecting unit 220 includes a touch panel integral with the display unit 210. The operation detecting unit 220 may employ any method for detecting an operation, for example, a capacitive type, a pressure-sensitive type such as a resistance film type, an infrared radiation type, or an electromagnetic induction type.

When the display unit 210 is a display control apparatus of the irradiation type or the like, a person detecting sensor or the like may be used as the operation detecting unit 220 to detect an operation.

The image processor 230 is a functional unit for processing various types of images. That is, when content is to be displayed on the display unit 210, the image processor 230 performs various types of processing. For example, a still image is enlarged or reduced in size for display as content, or a moving image is played as content.

In addition, the image processor 230 creates, from content, a sheet which serves as a thumbnail image, and performs various types of image processing, such as a color adjustment process and a sharpening process, on content.

The communication unit 240 is a network interface for connection to the network NW. The communication method may be wired/wireless and a LAN/WAN. That is, in the first embodiment, as long as the communication unit 240 communicates with the display apparatus 10 and the shared server 30, any configuration may be employed. In the case of a wired LAN, an Ethernet® standard, such as 10BASE-T, 100BASE-TX, or 1000BASE-T, is used. In the case of a wireless LAN, a standard such as IEEE802.11a/b/g/n is used. In the case of a WAN, LTE, WiMAX, 3G, or the like is used.

In the case where the shared server 30 is not used and where the communication unit 240 directly communicates with the display apparatus 10, near field communication, such as Bluetooth® or ZigBee, may be used.

The storage unit 250 is a functional unit that stores various programs used in operations performed by the terminal apparatus 20 and that stores various types of data. The storage unit 250 includes, for example, a semiconductor memory such as an SSD and a magnetic disk such as an HDD.

The storage unit 250 stores shared folder setting information 252. In the storage unit 250, a content storage area 254 is allocated.

The shared folder setting information 252 stores settings of a shared folder for sharing content with other apparatuses such as the display apparatus 10. For example, in the case where "\\Server\share\user1" is stored, the specified folder (directory) is set as the shared folder.

The content storage area 254 stores content. Content created or edited by the terminal apparatus 20 and content received from other apparatuses are stored. The content according to the first embodiment indicates various types of data represented in various data formats, such as text data, document data, an audio file, an image file (still-image data), and a moving image file (moving image data).

Shared Server

Figure 4:
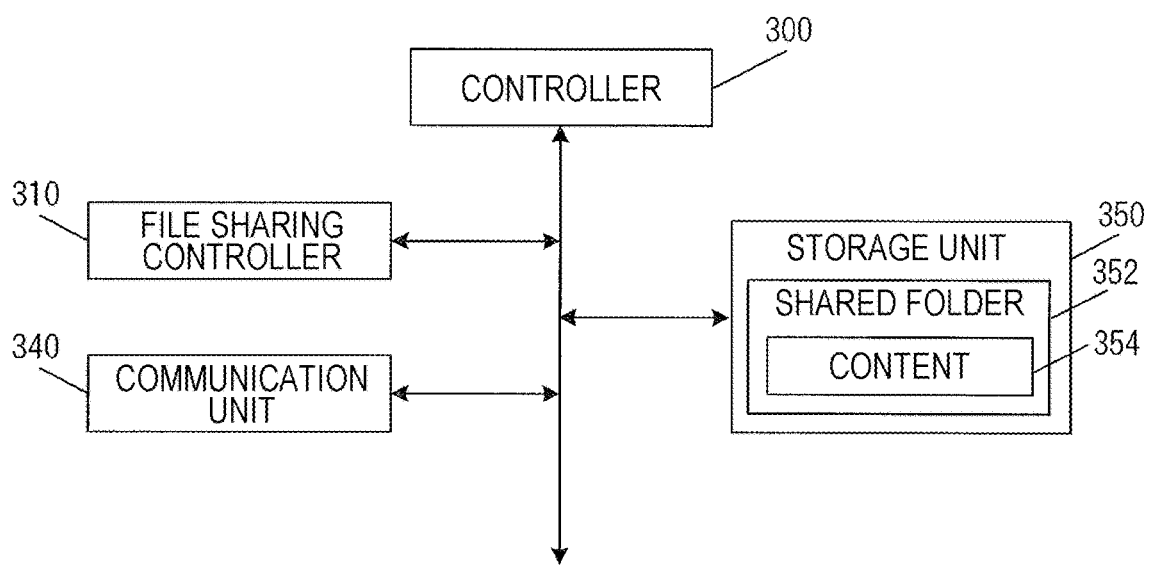
FIG. 4 is a diagram for describing the functional configuration of a shared server according to the first embodiment.

The functional configuration of the shared server 30 will be described by using FIG. 4. As illustrated in FIG. 4, the shared server 30 includes a controller 300, a file sharing controller 310, a communication unit 340, and a storage unit 350. The shared server 30 may include an operation unit and a display unit when appropriate.

The controller 300 is a functional unit for controlling the entire shared server 30. The controller 300 reads and executes various programs stored in the storage unit 350, so as to implement various functions. The controller 300 includes, for example, a CPU.

The file sharing controller 310 is a functional unit for providing a file sharing service. For example, the file sharing controller 310 is a functional unit that sets a shared folder and that sets access permission to the shared folder. The file sharing service is implemented, for example, by using server message block (SMB), NetBIOS extended user interface (NetBEUI), web-based distributed authoring and versioning (WebDAV), or the like, or file transfer protocol (FTP) or the like.

The communication unit 340 is a network interface for connection to the network NW. The communication method may be wired/wireless and a LAN/WAN. That is, in the first embodiment, as long as the communication unit 340 communicates with the display apparatus 10 and the terminal apparatus 20, any configuration may be employed. In the case of a wired LAN, an Ethernet® standard, such as 10BASE-T, 100BASE-TX, or 1000BASE-T, is used. In the case of a wireless LAN, a standard such as IEEE802.11a/b/g/n is used. In the case of a WAN, LTE, WiMAX, 3G, or the like is used.

The storage unit 350 is a functional unit that stores various programs used in operations performed by the shared server 30 and that stores various types of data. The storage unit 350 includes, for example, a semiconductor memory such as an SSD and a magnetic disk such as an HDD.

In the storage unit 350, a shared folder 352 is set. In the shared folder 352, content 354 is stored.

One or more shared folders 352 may be set. A corresponding shared folder 352 may be set for each display apparatus 10. In addition, the shared folder 352 may be associated with a tunnel tray described below.

Process Flow

The process flow according to the first embodiment will be described by using figures. Before execution of the processes, a common shared folder is set in the display apparatus 10 and the terminal apparatus 20.

That is, one of the folders in the shared server 30 is set as a shared folder. The shared folder is set as being shared, so as to be capable of receiving, for example, read/write operations from the display apparatus 10 and the terminal apparatus 20. The shared folder that has been set is stored as the shared folder setting information 152 and the shared folder setting information 252.

Processes Performed by the Terminal Apparatus

Figure 5:
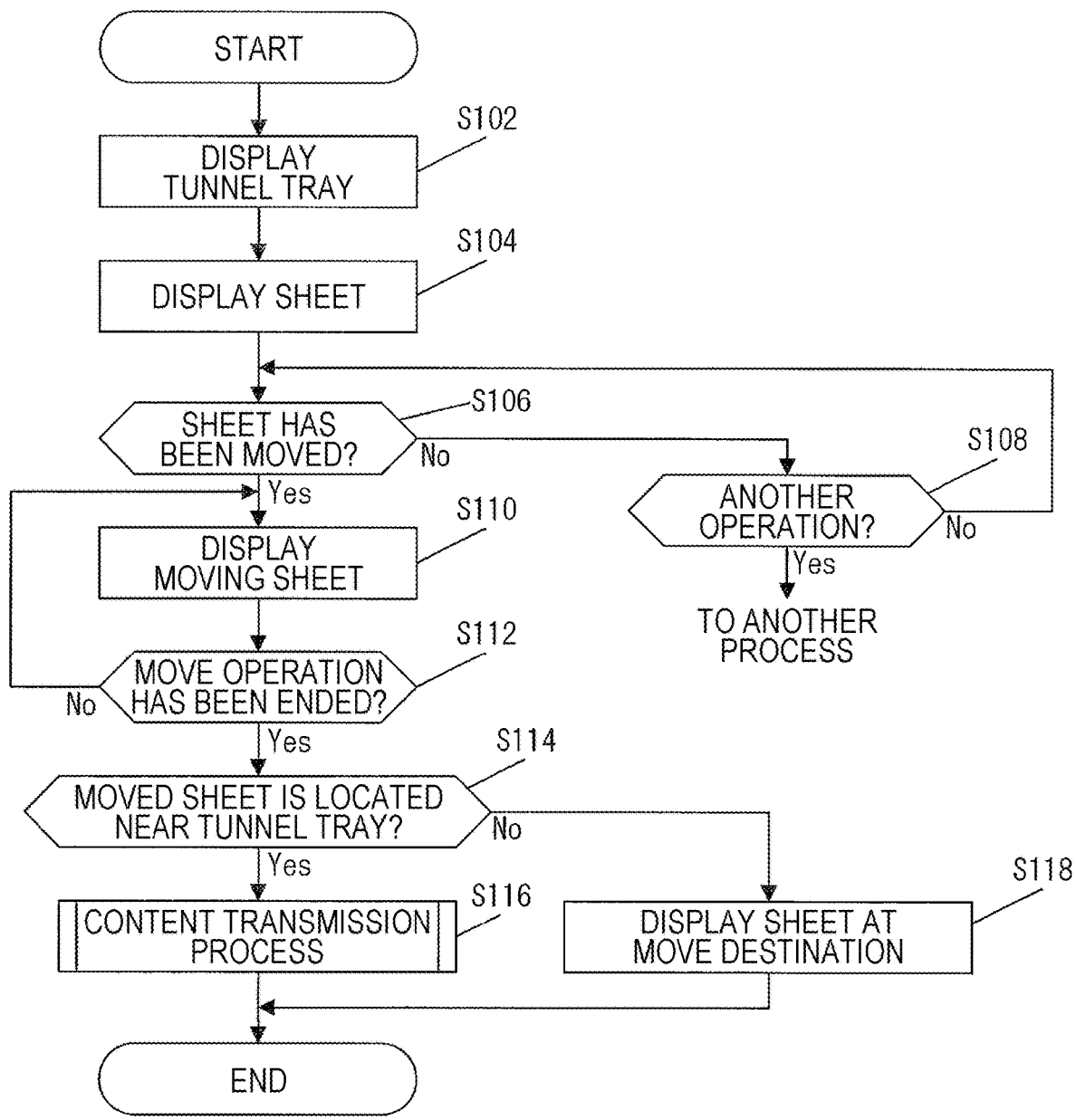
FIG. 5 is a flowchart for describing operations performed by a terminal apparatus according to the first embodiment.

Processes performed by the terminal apparatus 20 will be described based on FIG. 5. The terminal apparatus 20 displays a tunnel tray in a given display area on the display screen of the terminal apparatus 20 (step S102). The tunnel tray is a type of discriminative display for file delivery, and is displayed as a transmission icon. In the first embodiment, a circle is displayed at a position on the display screen to deliver files. The circle may be displayed on the front (the foreground) on the display screen at all times, and may be displayed in a given color (for example, red or blue). The representation of a tunnel tray is exemplary. As long as the discriminative display indicates an area for file delivery, another figure, characters, or the like may be used. Alternatively, a given area (coordinates) of the display screen may be set as the tunnel tray.

That is, a tunnel tray indicates a display for indicating a specific area of the display screen. The tunnel tray may be disposed at any position on the display screen. A user may set the size, the color, and the like as the user likes. In addition, when appropriate, instead of displaying a tunnel tray, a specific area of the display screen may have functions equivalent to the functions of the tunnel tray.

The terminal apparatus 20 displays a sheet (step S104). A sheet is an image indicating content, and one or more sheets may be displayed on the display screen of the terminal apparatus 20. A sheet indicates content that may be stored or read by the terminal apparatus 20. A sheet may indicate content created by the terminal apparatus 20, or may indicate content received from another apparatus.

Then, the terminal apparatus 20 determines whether or not a sheet has been moved (step S106). For example, when the terminal apparatus 20 detects a touch operation and a subsequent dragging operation on a sheet, the terminal apparatus 20 determines that a move operation has been detected. If another operation has been performed, the process (for example, copying, deleting, or printing) corresponding to the operation is performed. In the first embodiment, this case is not described (the Yes branch of step S108 from the No branch of step S106).

While a move operation is being performed on a sheet, the moving sheet is displayed (step S110). Any way of displaying a moving sheet may be employed as long as it indicates that the sheet is moving. For example, the moving image itself of the displayed sheet may be displayed. Alternatively, a moving discriminative display (for example, a rectangular display) indicating that the sheet is moving may be displayed.

If the terminal apparatus 20 detects end of the move operation (Yes in step S112), the terminal apparatus 20 determines the coordinates at which the move operation has been ended, and the terminal apparatus 20 determines whether or not the moved sheet is located near the tunnel tray (step S114).

Various methods may be used for determination about whether or not the moved sheet is located near the tunnel tray. For example, the terminal apparatus 20 may determine whether or not the center coordinates of the sheet are included in the area of the tunnel tray or its neighboring area (for example, ±5 pixels from a rectangular area including the tunnel tray). Alternatively, any coordinates in the area of the sheet (for example, the rectangular area) may be compared with coordinates of the tunnel tray.

Thus, various methods may be set as a design matter for determination about whether or not the moved sheet is located near the tunnel tray. Therefore, for example, like collision detection, any method may be used as long as it occurs to a person skilled in the art.

If the moved sheet is located near the tunnel tray, a content transmission process is performed (step S116 from the Yes branch of step S114). If the moved sheet is not located near the tunnel tray, the terminal apparatus 20 determines that the operation is a normal move operation. The terminal apparatus 20 displays the sheet at the position at which the move operation has been ended, and the process ends (step S118 from the No branch of step S114).

A move operation may be a flick operation. That is, when the terminal apparatus 20 detects a flick operation as the move operation performed in step S106, the terminal apparatus 20 determines a set of coordinates, along which the touch moves, and the move speed. If the move direction is the direction to the tunnel tray, and if the move speed is equal to or more than a given threshold, the terminal apparatus 20 performs the content transmission process. That is, a sheet may be moved to the tunnel tray by using a dragging operation or a flick operation.

The Content Transmission Process

Figure 6:
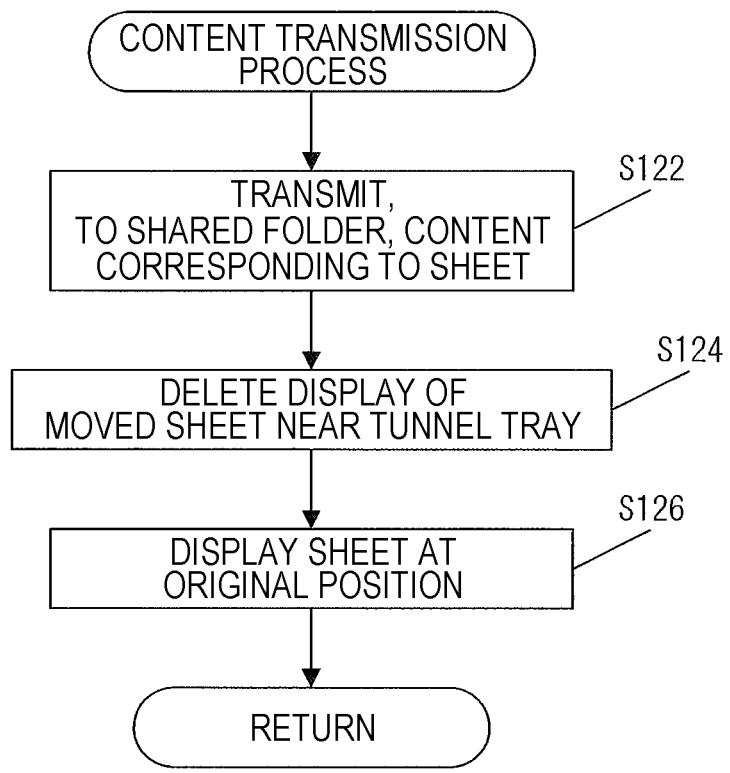
FIG. 6 is a flowchart for describing a transmission process performed by a terminal apparatus according to the first embodiment.

The content transmission process performed by the terminal apparatus 20 will be described by referring to FIG. 6. The terminal apparatus 20 transmits, to the shared folder, the content corresponding to the sheet having been moved to a position near the tunnel tray (step S122).

After transmission of the content to the shared folder, the terminal apparatus 20 deletes the display of the moved sheet near the tunnel tray (step S124), and displays the sheet at the original position at which the sheet was located before the move (step S126).

In the process described above, after transmission of the content, the terminal apparatus 20 deletes the display of the moved sheet near the tunnel tray. As a matter of course, the processes in the reverse order may be performed. That is, after deletion of the display of the moved sheet near the tunnel tray (step S124), the terminal apparatus 20 may transmit the content to the shared folder (step S122).

A user may select whether or not the sheet is to be displayed at the original position at which the sheet was located before the move. Alternatively, the selection may be changed through settings. For example, when a sheet has been moved with a single touch operation, the sheet may be displayed at the original position at which the sheet was located before the move (that is, a copy operation). When a sheet has been moved with a multi-touch operation, the sheet is not necessarily displayed at the original position at which the sheet was located before the move (that is, a move operation).

In this case, the sheet may be accommodated in the drawer (for example, D130 in FIGS. 10A to 10C) associated with the sheet. Alternatively, the sheet may be reduced in size and displayed in a portion (for example, a predetermined thumbnail area) of the area of the display screen.

Processes Performed by the Display Apparatus

Figure 7:
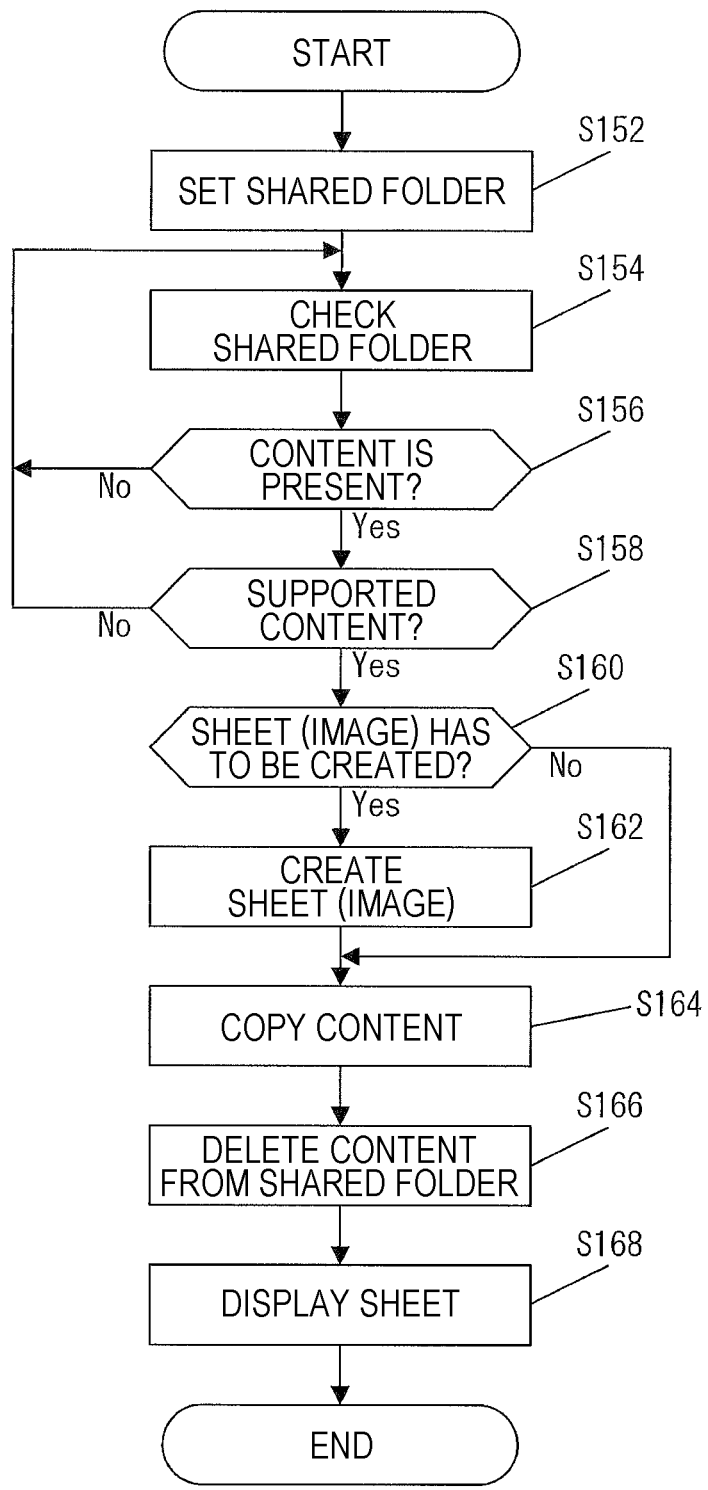
FIG. 7 is a flowchart for describing a reception process performed by a display apparatus according to the first embodiment.

Processes performed by the display apparatus 10 will be described by referring to FIG. 7. In the display apparatus 10, the shared folder is set (step S152). If a user has set the shared folder in advance, or if an administrator has set the shared folder, the process is not necessarily performed.

The display apparatus 10 regularly checks if content has been stored in the shared folder (step S154). The display apparatus 10 checks the shared folder every given time (for example, every 3 seconds, every 10 seconds, or every 30 seconds). The display apparatus 10 repeatedly checks the shared folder until content has been stored in the shared folder (step S154 from the No branch of step S156).

If content has been stored (is present) in the shared folder (Yes in step S156), the display apparatus 10 determines whether or not the content is supported (step S158).

Supported content is, for example, content that is capable of being displayed, played, and opened for use by the display apparatus 10. For example, if an application for displaying or editing the content is not present, or if a corresponding codec has not been installed, the display apparatus 10 determines that the content is not supported, and ignores the content (step S154 from the No branch of step S158).

Some examples will be described. For example, in the case where content stored in the shared folder is a "dxf file", if an application for using a dxf file has not been installed in the display apparatus 10, the display apparatus 10 determines that the content is not supported. In the case where content is an "avi file", assume the following case. An application for using an avi file has been installed. However, a codec for the file has not been installed, and the file fails to be played. In this case, the display apparatus 10 determines that the content is not supported.

Not-supported content is ignored as described above. In addition, such content may be deleted from the shared folder.

If the content stored in the shared folder is supported (Yes in step S158), a sheet (image) is created when the sheet (image) has to be created (step S162 from the Yes branch of step S160). For example, in the case where the content is still-image content, and where the still-image content (still-image data), as it is, is reduced in size and displayed as a sheet, a sheet image is not necessarily created. Therefore, the still-image content may be used as it is as a sheet (No in step S160). When the content already includes a preview image, the preview image may be used as it is as a sheet (image).

Even in the case of still-image content, if the content includes multiple pieces of still-image data, one of the still images may be specified as a sheet (image), and a sheet may be created from the specified still image.

Then, the display apparatus 10 copies the content from the shared folder of the shared server 30 to a folder of the display apparatus 10 (step S164). The display apparatus 10 deletes the content from the shared folder (step S166), and displays the sheet corresponding to the content on the display screen of the display apparatus 10 (step S168).

As a matter of course, the order of the steps described above may be changed in the range in which no contradiction occurs in the process. For example, step S164 may be performed after step S158. That is, the content is first copied to the display apparatus 10, and a sheet is then created based on the copied content.

Exemplary Operations

Figure 8A:
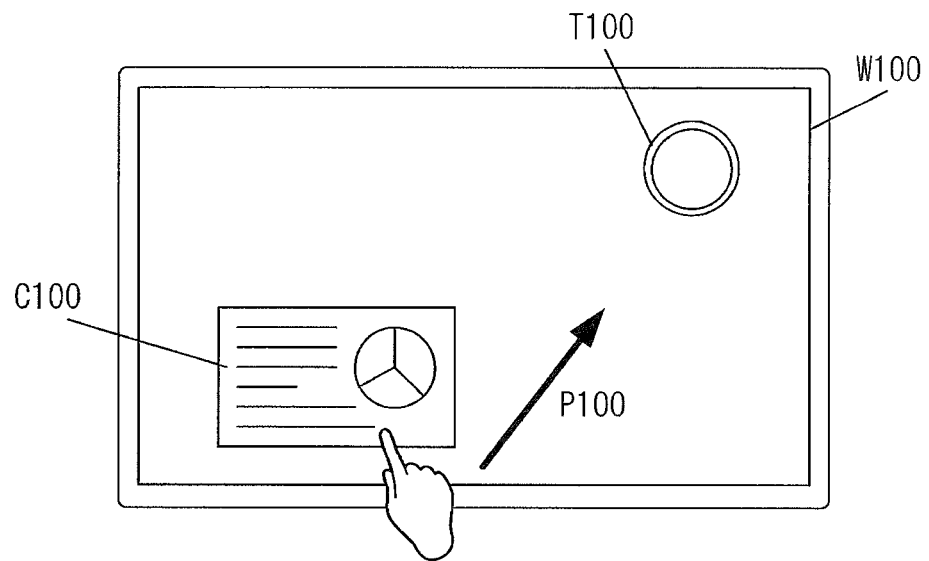
FIGS. 8A and 8B are diagrams for describing an exemplary operation according to the first embodiment.
Figure 8B:
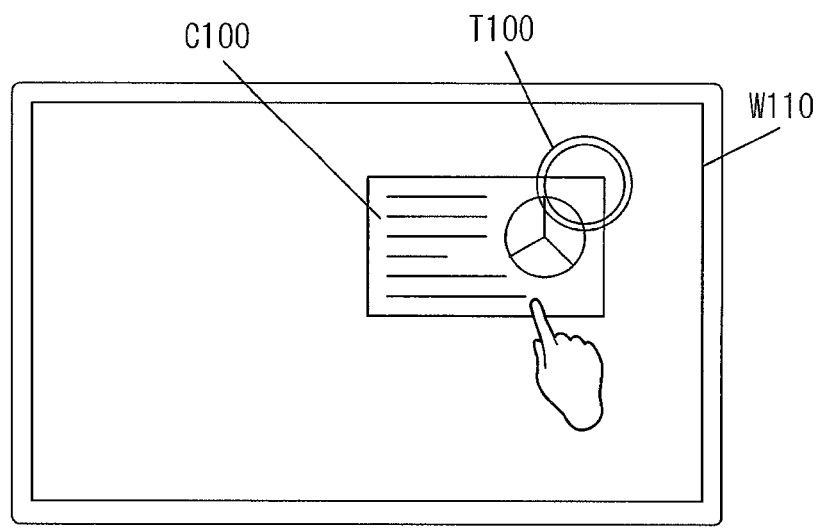
Figure 9A:
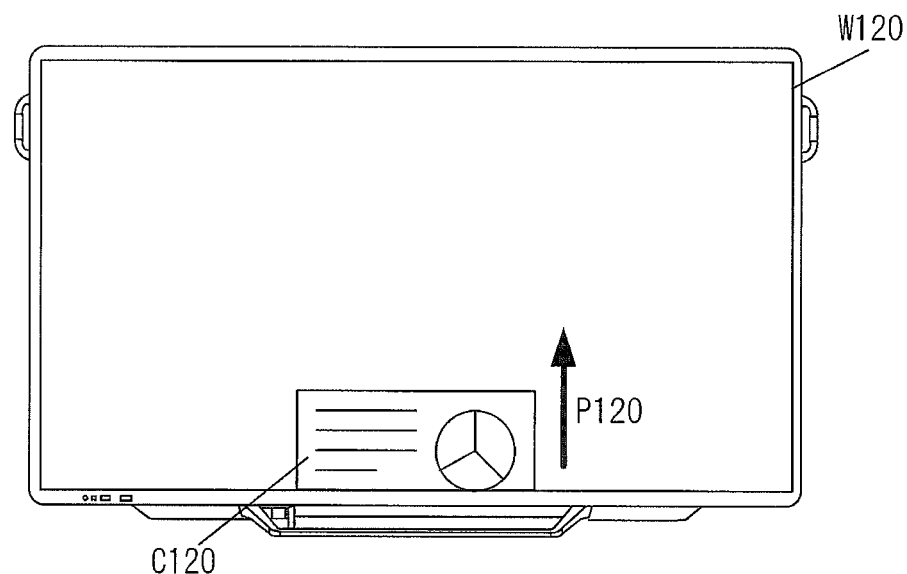
FIGS. 9A and 9B are diagrams for describing an exemplary operation according to the first embodiment.
Figure 9B:
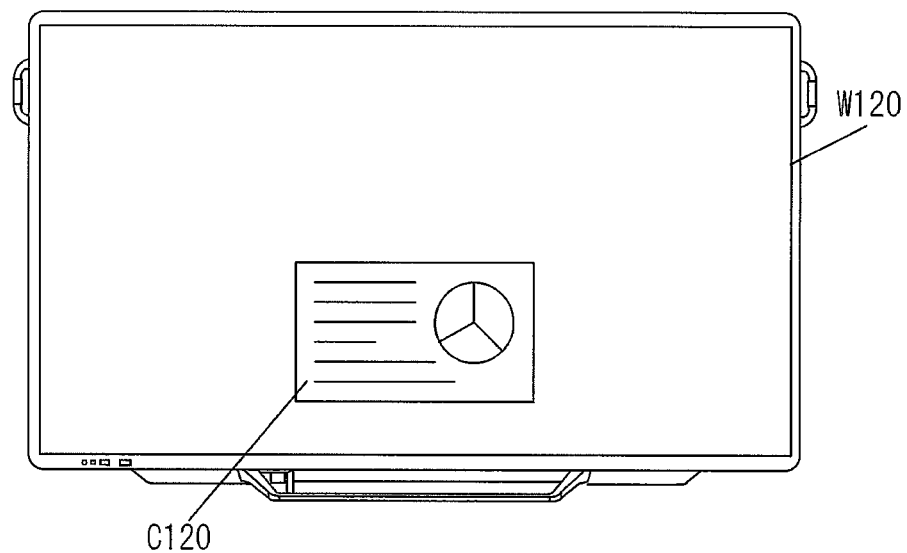

Exemplary operations according to the first embodiment will be described. FIGS. 8A and 8B illustrate exemplary display screens of the terminal apparatus 20. FIGS. 9A and 9B illustrate exemplary display screens of the display apparatus 10.

In the first embodiment, the display apparatus 10 and the terminal apparatus 20 are capable of displaying content. The display apparatus 10 is taken as an example. A sheet corresponding to content is displayed in an area called a work area provided on the display screen.

A sheet is image data created based on content, and is a preview image indicating the content. For example, when the content is a document file, a preview image created from a representative page may be displayed. When the content is a moving image file, a capture image of a certain scene may be displayed as a still image, or the content may be displayed as a moving image by playing the content on the sheet.

A user drags content from an external application or a drawer and drops the content in the work area provided on the display screen, or selects and opens the content. Thus, the content may be displayed as a sheet. When the content is a still-image file, the still image is displayed. When the content is a moving image file, the moving image file is displayed. When the content is a document file having multiple pages, a sheet on which the pages may be turned is displayed.

Thus, a user's selection of a sheet may cause the corresponding content to be displayed. A sheet may be moved, enlarged, reduced in size, and rotated. In addition, operations, such as a page split and page coupling, may be performed on a sheet.

FIG. 8A illustrates an exemplary display screen W100 displayed on the terminal apparatus 20. On the display screen W100, a tunnel tray T100 is displayed. In the work area of the display screen, a sheet C100 indicating content is displayed. The sheet that is moved, enlarged, reduced in size, and rotated may be displayed.

A user selects the sheet C100 with a touch operation, and moves the sheet C100 in the direction P100. Then, the moving sheet C100 is displayed, and the display is changed to the state in FIG. 8B.

On a display screen W110 in FIG. 8B, the moving sheet C100 is displayed near the tunnel tray T100. At that time, the tunnel tray T100 is displayed above the sheet C100.

In this state, when the user releases the selection (performs a touch up operation), the content corresponding to the sheet C100 is transmitted (copied) to the shared folder. The shared folder is set in the shared folder setting information 252. In the first embodiment, the shared folder is the shared folder 352 of the shared server 30.

FIGS. 9A and 9B are diagrams for describing an exemplary operation performed by the display apparatus 10. The display apparatus 10 regularly checks the shared folder, and detects newly stored content.

When the display apparatus 10 confirms presence of new content, the display apparatus 10 creates a sheet corresponding to the content (an image corresponding to a preview image of the content). The display apparatus 10 displays the created sheet on a display screen W120.

For example, in the first embodiment, a sheet C120 is displayed on the display screen W120 from below. The sheet C120 sliding in the direction P120 is displayed. As illustrated in FIG. 9B, the sheet C120 is displayed on the display screen W120. Thus, in the first embodiment, the display apparatus 10 is capable of automatically receiving content transmitted from the terminal apparatus 20.

A sheet image corresponding to the received content is automatically created. The created image is automatically displayed in the work area of the display screen of the display apparatus 10.

At that time, the sheet may be discriminatively displayed. For example, the display form of the sheet may be changed and displayed so as to indicate that it is newly obtained content. For example, the frame color may be changed for a certain time, or the sheet may be displayed with emphasis. In addition, the transparency may be changed, or the sheet may blink. Thus, a sheet may be discriminatively displayed for a time. In this manner, a user may be notified of which sheet is new.

A display apparatus of the related art will be described by referring to FIGS. 10A to 10C. For example, drawers associated with folders of the display apparatus of the related art are displayed on the display apparatus. When a user selects a drawer, a list of pieces of content contained in the folder corresponding to the drawer is displayed.

Figure 10A:
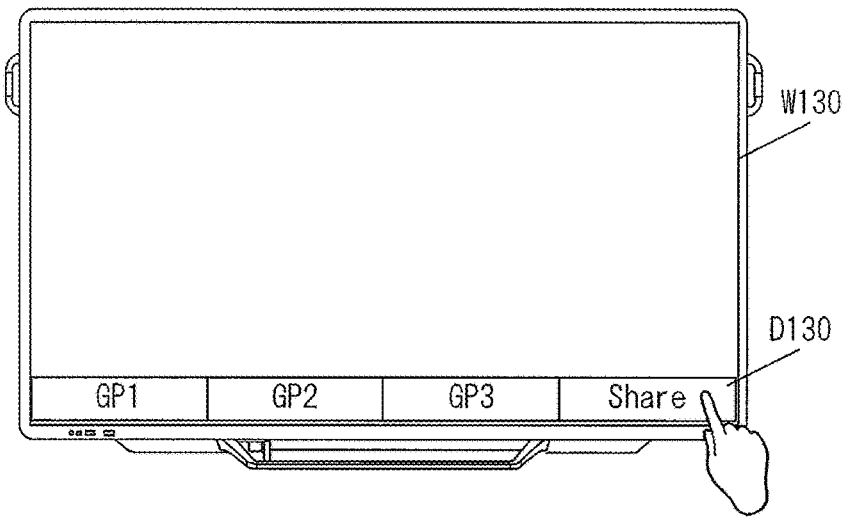
FIGS. 10A to 10C are diagrams for describing an exemplary operation of the related art.

Specifically, as illustrated in FIG. 10A, a list of drawers is displayed in a lower end portion of a display screen W130. At that time, when the user selects the drawer D130, a screen transition is made. FIG. 10B illustrates the screen displayed after the transition.

Figure 10B:
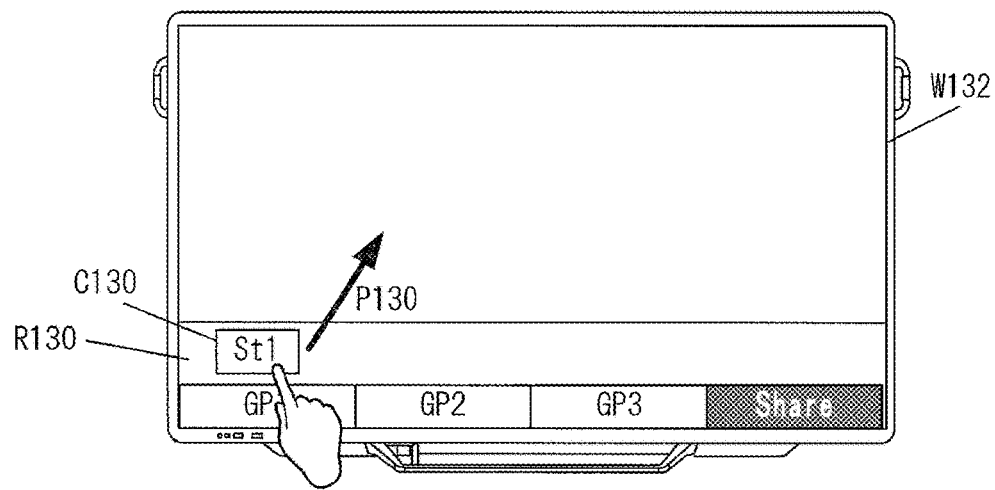
Figure 10C:
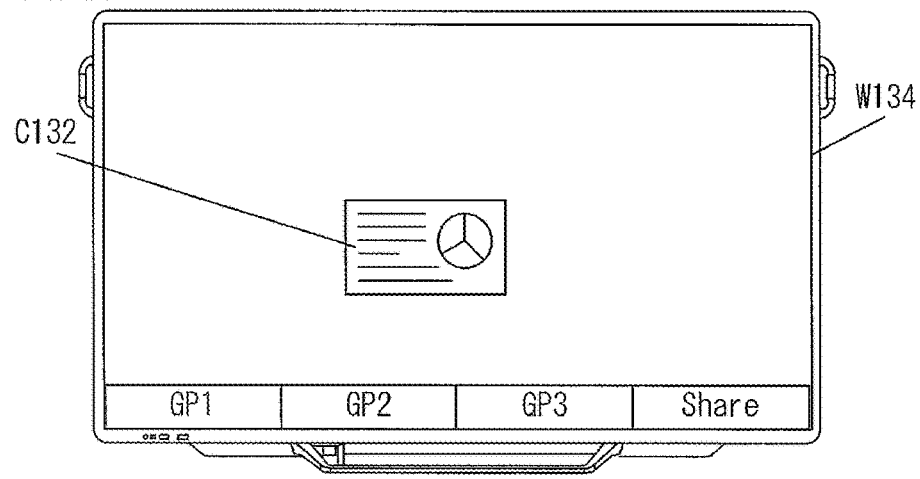

In FIG. 10B, a list of the reduced images of the sheets corresponding to the pieces of content contained in the drawer D130 is displayed in an area R130. At that time, a list of pieces of content is displayed. In this state, when the user selects content C130 and moves the content C130 in the direction P130 (that is, moves the content C130 to the work area), a sheet corresponding to the content is created and displayed in the work area.

Thus, in the related art, the display apparatus 10 does not have a way to recognize reception of content. Even when content is received, the content has to be selected and then displayed. In addition, in creation of sheets based on content, only the sheet corresponding to the selected content is displayed. No functions for automatically creating and displaying a sheet are provided.

The first embodiment enables easy reception/transmission (delivery) of content between the display apparatus 10 and the terminal apparatus 20. In the display apparatus 10, since a sheet corresponding to content is created and displayed without a user's effort, the user may easily grasp what kind of content has been received.

Second Embodiment

A second embodiment will be described. In the first embodiment, every time a content file is received from the shared folder, the file is deleted. In the second embodiment, a list of pieces of content that are being displayed is used for display. The functional configuration of the apparatuses according to the second embodiment is the same as that according to the first embodiment. The process flows according to the second embodiment are the same as those according to the first embodiment except that the sheet receiving process in FIG. 7 is replaced by the sheet receiving process in FIG. 11. Identical processes are designated with identical reference characters, and will not be described.

Figure 11:
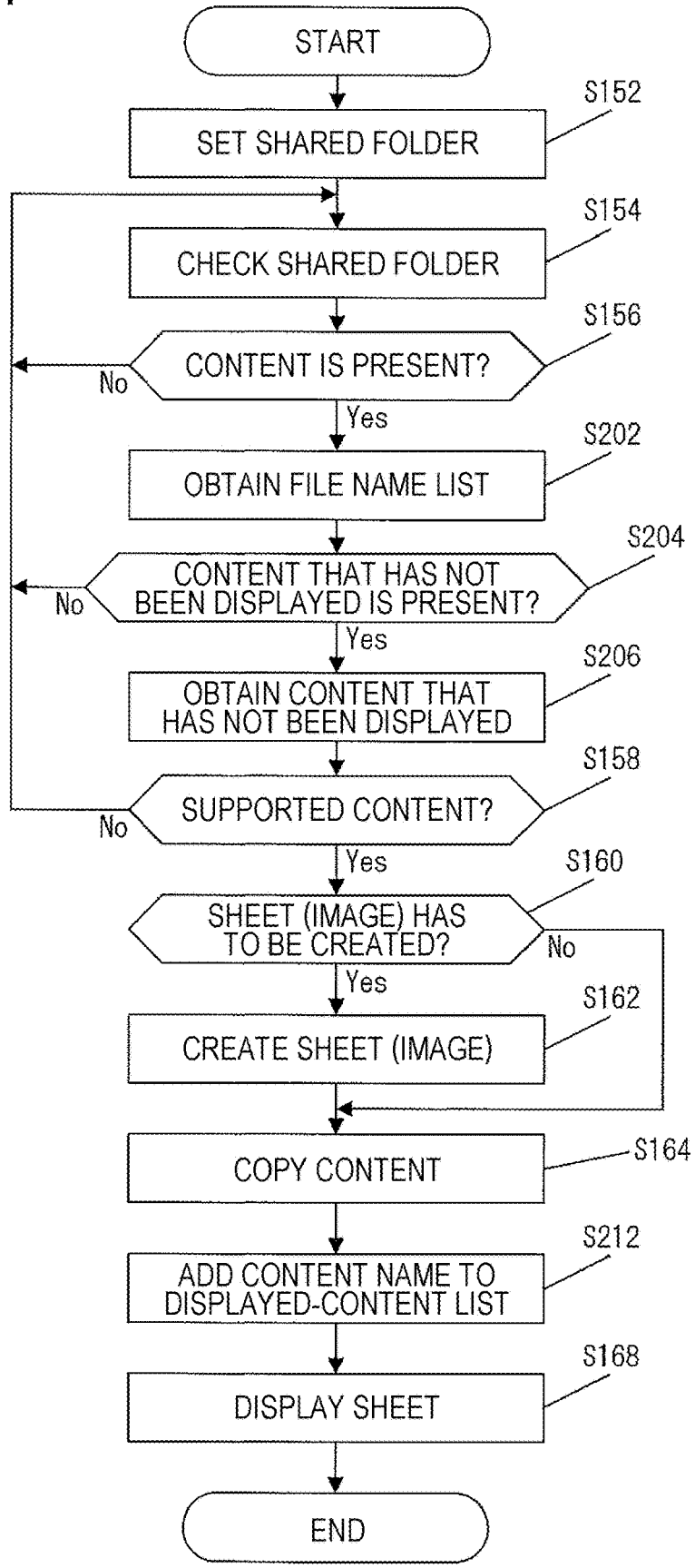
FIG. 11 is a flowchart for describing a reception process performed by a display apparatus according to a second embodiment.

In the process in FIG. 11, the display apparatus 10 checks the shared folder in step S156. If the display apparatus 10 confirms presence of content in the shared folder (Yes in step S156), the display apparatus 10 obtains a list of the names of the files contained in the shared folder (step S202).

The display apparatus 10 checks a displayed-content list which indicates pieces of displayed content and which is stored in the display apparatus 10, and determines whether or not content which has not been displayed is present in the obtained list of file names (step S204). If content which has not been displayed is present, that is, if content which is not stored in the displayed-content list is present, the display apparatus 10 obtains the content which has not been displayed (step S206 from the Yes branch of step S204). If the display apparatus 10 supports the content, the display apparatus 10 copies the content (step S164 from the Yes branch of step S158), and updates the displayed-content list so that the content name is added to the displayed-content list (step 212).

Thus, according to the second embodiment, use of a displayed-content list enables reception of desirable content without deletion of content. This process is effective in the case where multiple display apparatuses 10 for display are connected and where each display apparatus displays transmitted content.

Third Embodiment

Figure 12:
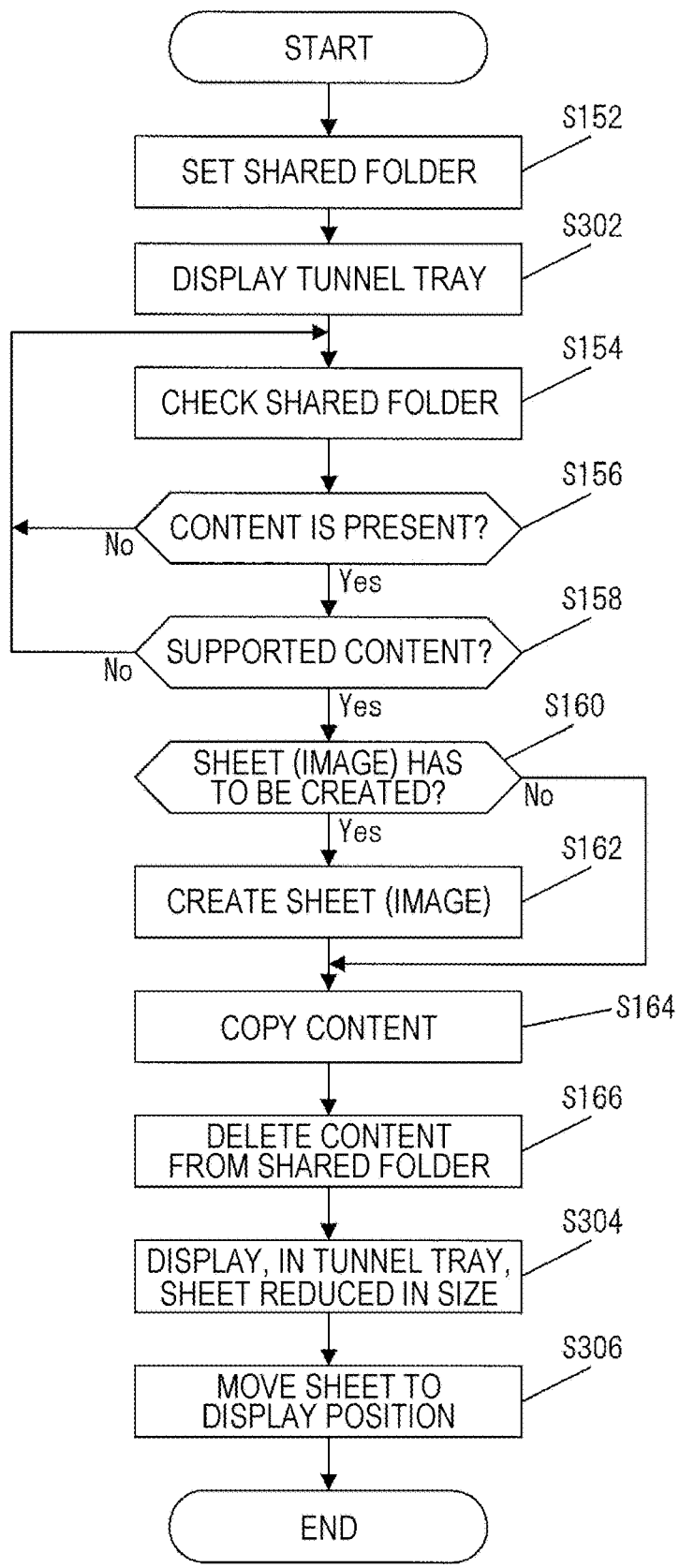
FIG. 12 is a flowchart for describing a reception process performed by a display apparatus according to a third embodiment.

A third embodiment will be described. In the third embodiment, a tunnel tray is displayed as a reception-side specified area on the display apparatus 10, and a sheet corresponding to content is displayed out of the tunnel tray. The functional configuration of the apparatuses according to the third embodiment is the same as that according to the first embodiment. The process flows according the third embodiment are the same as those according to the first embodiment except that the sheet receiving process in FIG. 7 is replaced by the sheet receiving process in FIG. 12. Identical processes are designated with identical reference characters, and will not be described.

The display apparatus 10 displays a tunnel tray on the display screen of the display apparatus 10 (step S302). A sheet corresponding to content is displayed out of the displayed tunnel tray.

That is, after the display apparatus 10 copies content, the display apparatus 10 displays, in the tunnel tray, the sheet having been reduced in size (step S304). Then, the display apparatus 10 displays the sheet moving to the display position of the sheet (step S306).

For the sake of convenience of explanation, the sheet is accommodated in the tunnel tray in the initial state. As long as the sheet is displayed near the tunnel tray, any configuration may be employed. For example, the sheet displayed so that a part of the sheet is located out of the tunnel tray may be displayed, or the sheet that is simply superimposed on the tunnel tray may be displayed.

An exemplary operation according to the third embodiment will be described by referring to FIGS. 13A to 13D. FIGS. 13A to 13D illustrate an exemplary display screen W300 on which a sheet is to be displayed. A tunnel tray T300 is displayed on the display screen W300 (in FIG. 13A).

When content is stored in the shared folder, the display apparatus 10 obtains the content. At that time, a sheet C300 corresponding to the content, which has been reduced in size, is displayed in the tunnel tray T300 (in FIG. 13B).

Figure 13A:
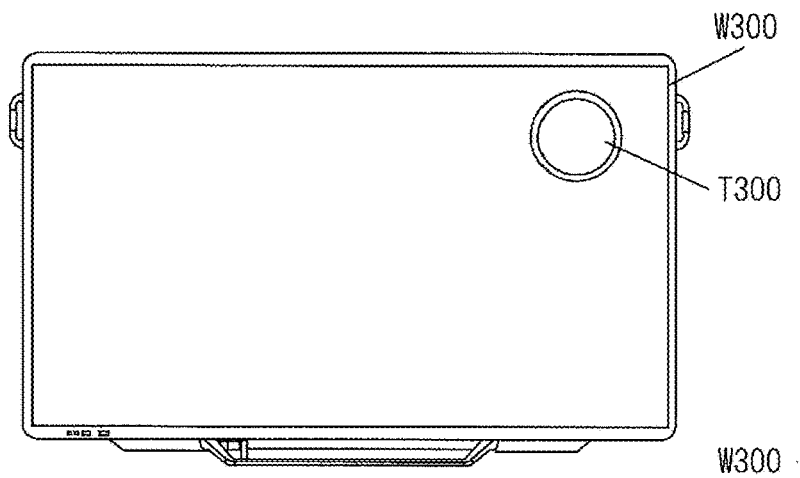
FIGS. 13A to 13D are diagrams for describing an exemplary operation according to the third embodiment.
Figure 13B:
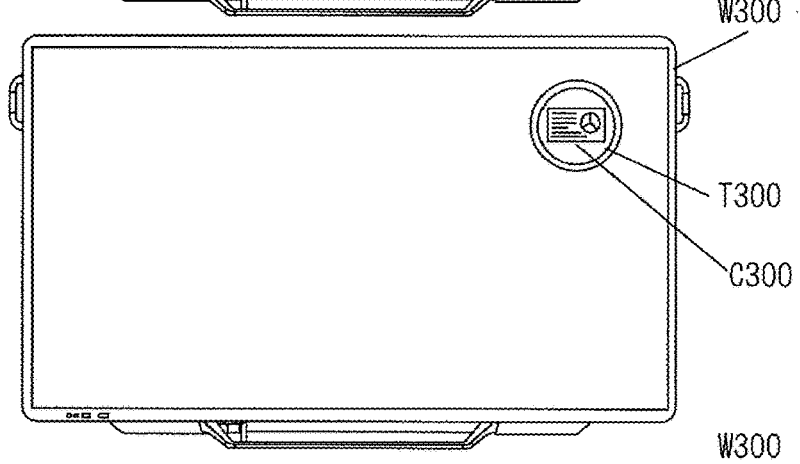
Figure 13C:
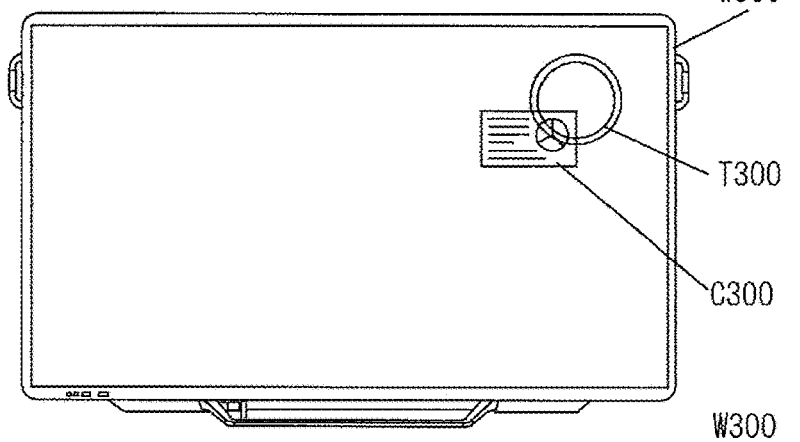
Figure 13D:
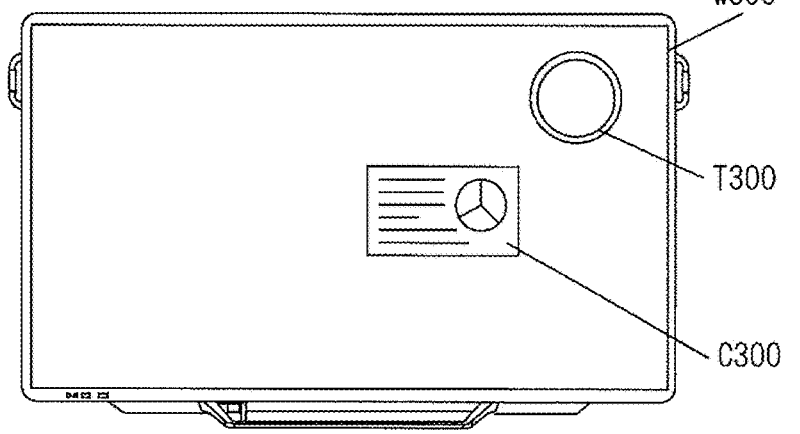

After that, the sheet is displayed while being gradually enlarged until the sheet is located at the display position of the sheet. That is, FIGS. 13C and 13D illustrate the state in which the moving sheet C300 is displayed while being gradually enlarged. Thus, a visual effect as if a sheet comes out of the tunnel tray may be expected.

That is, a user may throw a sheet into the tunnel tray on the terminal apparatus so that the content is transmitted to the display apparatus. On the display apparatus, while the sheet is displayed as if the sheet comes out of the tunnel tray, the content may be received. Thus, a user may feel as if the terminal apparatus is connected to the display apparatus through a tunnel.

Figure 14A:
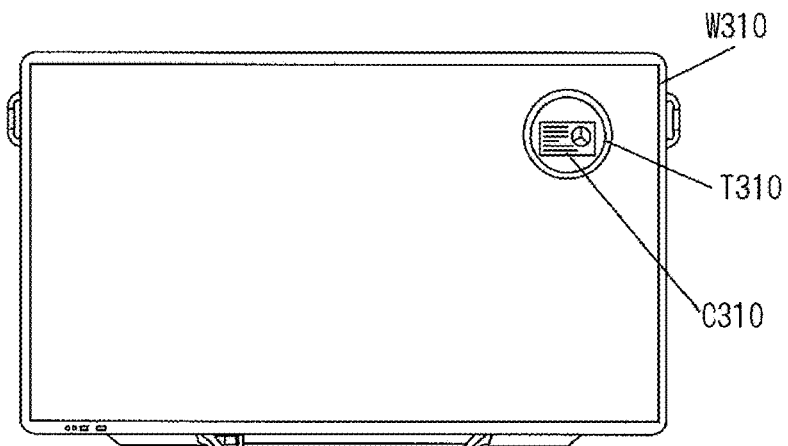
FIGS. 14A to 14D are diagrams for describing an exemplary operation according to the third embodiment.
Figure 14B:
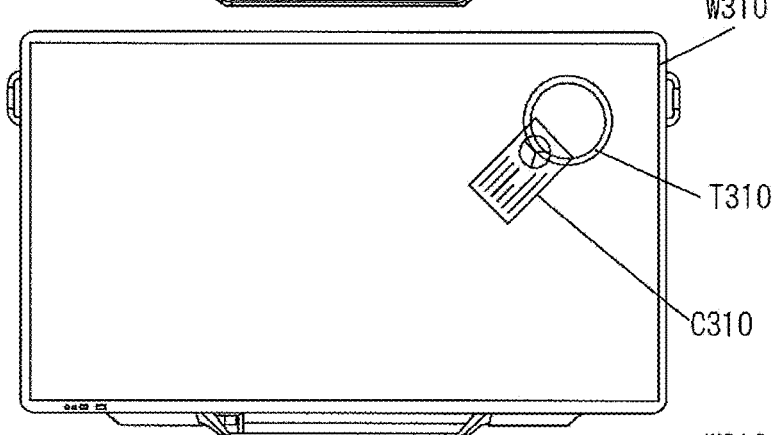
Figure 14C:
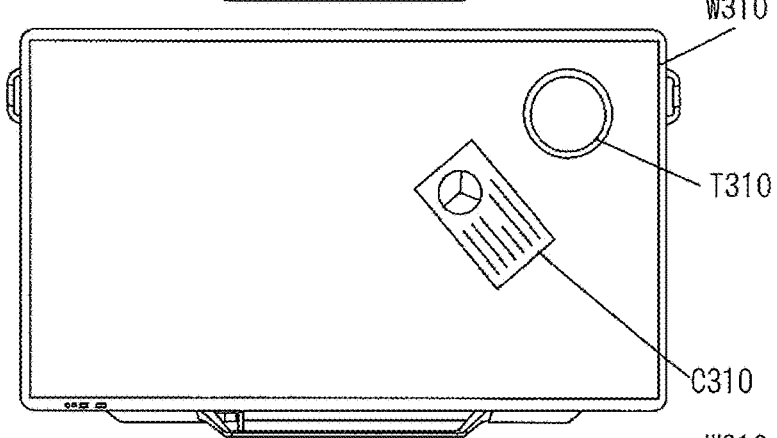
Figure 14D:
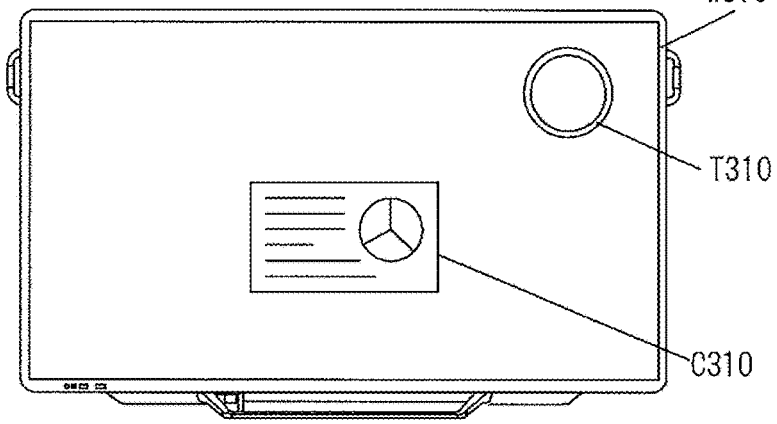

Various display forms may be employed. For example, on a display screen W310 in FIGS. 14A to 14D, a sheet C310 is displayed in a tunnel tray T310 in FIG. 14A; and the sheet C310 having been moved to the display position is displayed in FIG. 14D. At that time, FIGS. 14B and 14C illustrate the state in which, while being gradually enlarged, the sheet C310 is rotated. Thus, when a sheet is displayed, various visual effects may be applied to display of a moving sheet.

In addition to change of the display form, for example, the transparency rate may be gradually changed, or the background color may be gradually changed. Application of such visual effects is the characteristics of the third embodiment.

Fourth Embodiment

A fourth embodiment will be described. The fourth embodiment describes the case of presence of multiple pieces of content. As described above, sheets displayed out of the tunnel tray may be processed one by one. Alternatively, when multiple files are stored in the shared folder, the multiple files may be processed in a single process. The functional configuration of the apparatuses according to the fourth embodiment is the same as that according to the third embodiment. The process flows according to the fourth embodiment are the same as those according to the third embodiment.

FIGS. 15A to 15D are diagrams for describing an operation according to the fourth embodiment. FIGS. 15A to 15D illustrate an exemplary display screen W400 on which a tunnel tray 1400 is displayed. A sheet C400 is displayed in the tunnel tray 1400. Unlike the sheet C300 in FIG. 13B, the sheet C400 indicates the state in which multiple sheets are displayed. That is, multiple sheets are displayed as an image set. The sheet C400 includes two sheets, a sheet C410 and a sheet C420 illustrated in FIGS. 15B to 15D.

Figure 15A:
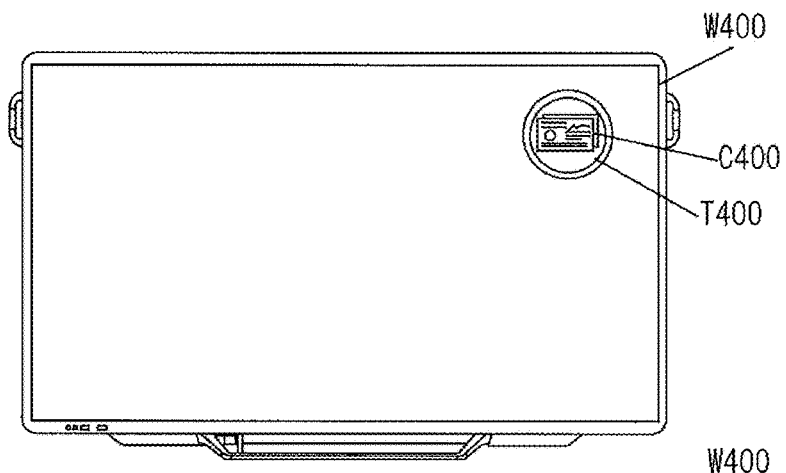
FIGS. 15A to 15D are diagrams for describing an exemplary operation according to a fourth embodiment.
Figure 15B:
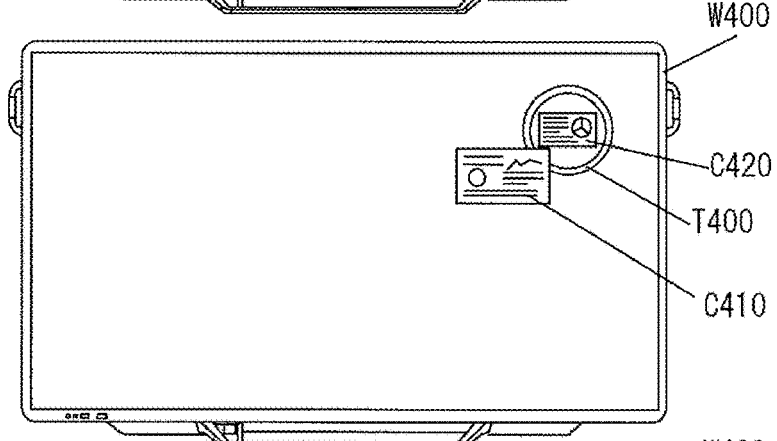

As illustrated in FIG. 15B, the moving sheet C410, which is one of the sheets, is first displayed. At that time, the sheet C420 which has not been moved is displayed as it is in the tunnel tray T400.

Figure 15C:
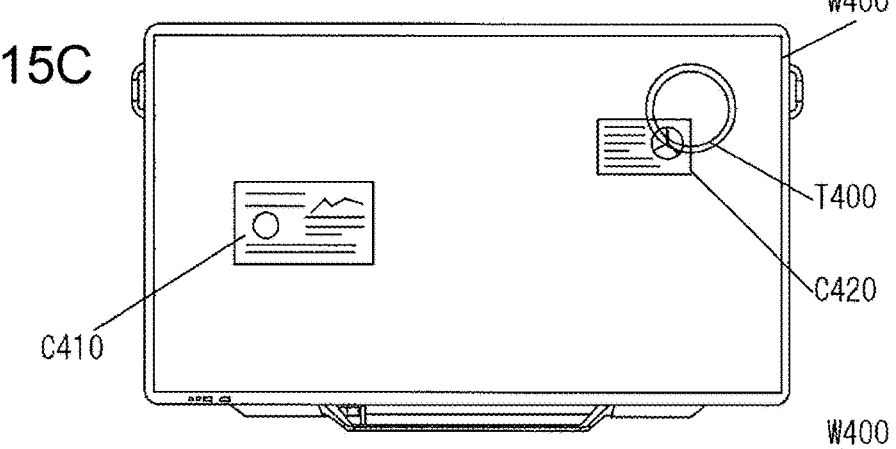

As illustrated in FIG. 15C, when the sheet C410 has been moved to a given position, the moving sheet C420 is also displayed. The timing of the move of the sheet C420 may be the same as the timing of the move of the sheet C410, or may be a timing after end of the move of the sheet C410. Alternatively, the timing of the move of the sheet C420 may be a timing during the move of the sheet C410.

Figure 15D:
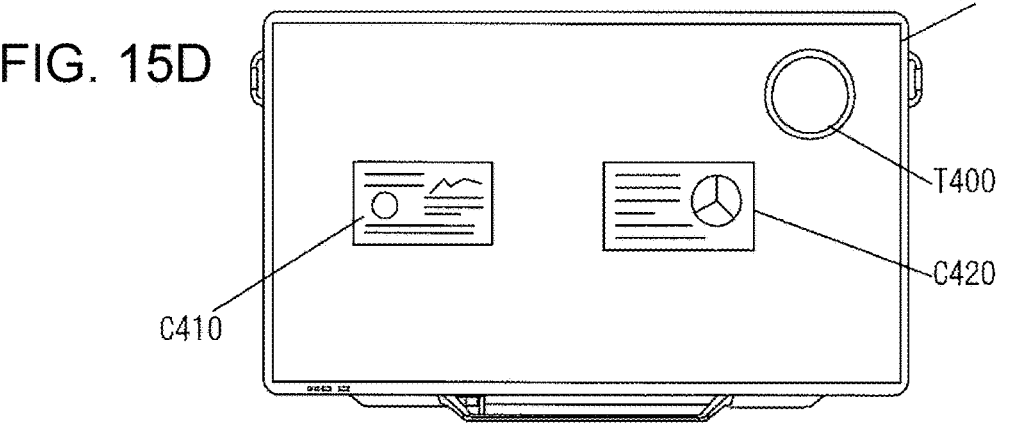

As illustrated in FIG. 15D, the sheet C420 is also moved to a given position. Thus, according to the fourth embodiment, multiple moving pieces of content (sheets) may be displayed. Accordingly, a user may visually recognize that multiple pieces of content are being received. When multiple sheets are included as an image set, the display forms of the multiple sheets (images) are sequentially changed. Thus, a user may visually find that multiple sheets are deployed.

Fifth Embodiment

A fifth embodiment will be described. The fifth embodiment describes the case in which the display apparatus 10 is not capable of processing a file stored in the shared folder (not-supported file). Points different from the third embodiment will be described in the fifth embodiment. As a matter of course, the different points may be applied to other embodiments.

Figure 16A:
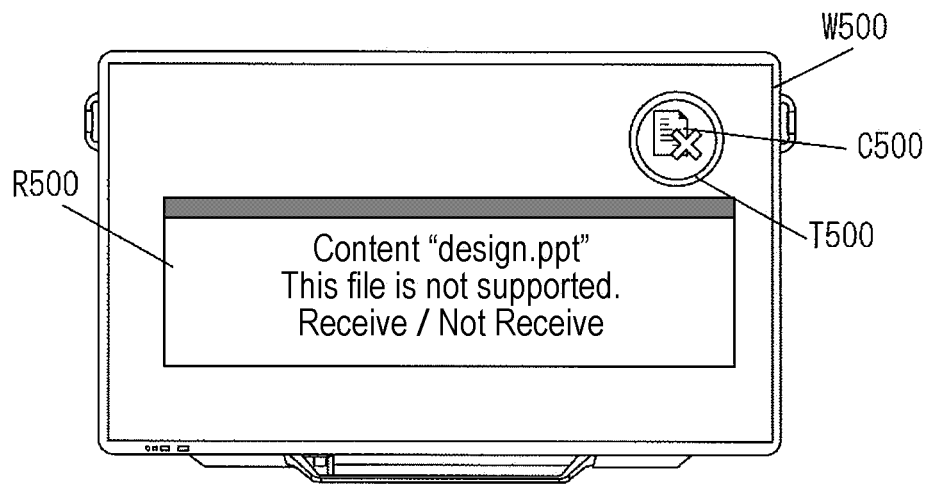
FIGS. 16A and 16B are diagrams for describing an exemplary operation according to a fifth embodiment.
Figure 16B:
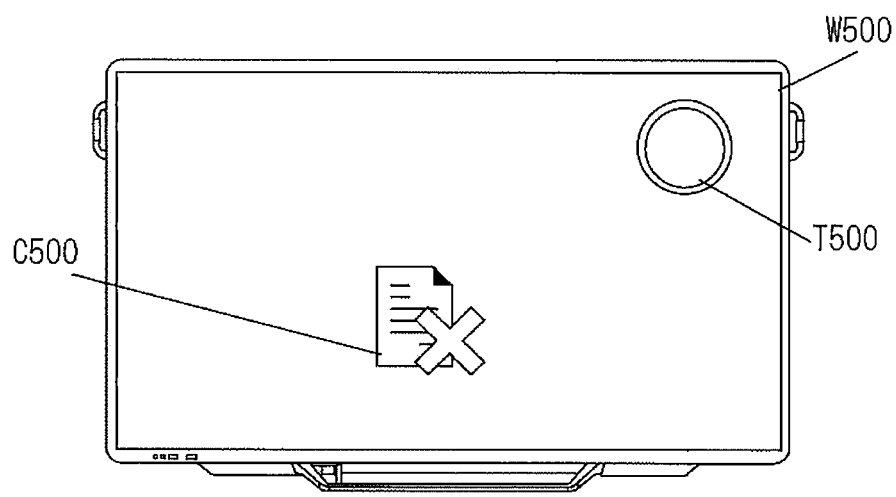

FIG. 16A illustrates a display screen W500 displayed when not-supported content is stored in the shared folder. An icon (discriminative display) C500 is displayed in a tunnel tray T500. A message, "This file is not supported." is displayed in an area R500. When a user selects "Receive" regardless of the not-supported file (content), the content is received.

In this case, the sheet fails to be displayed. Therefore, for example, the discriminative display C500 (for example, an icon, characters, or a symbol) for indicating not-supported content is displayed so as to be moved from the tunnel tray T500 onto the display screen W500.

Thus, according to the fifth embodiment, even a file of content or the like which the display apparatus 10 is not capable of processing may be received/transmitted. For example, a file received from a terminal apparatus may be transmitted through the display apparatus 10 to a different terminal apparatus.

Sixth Embodiment

Figures 17, 18:
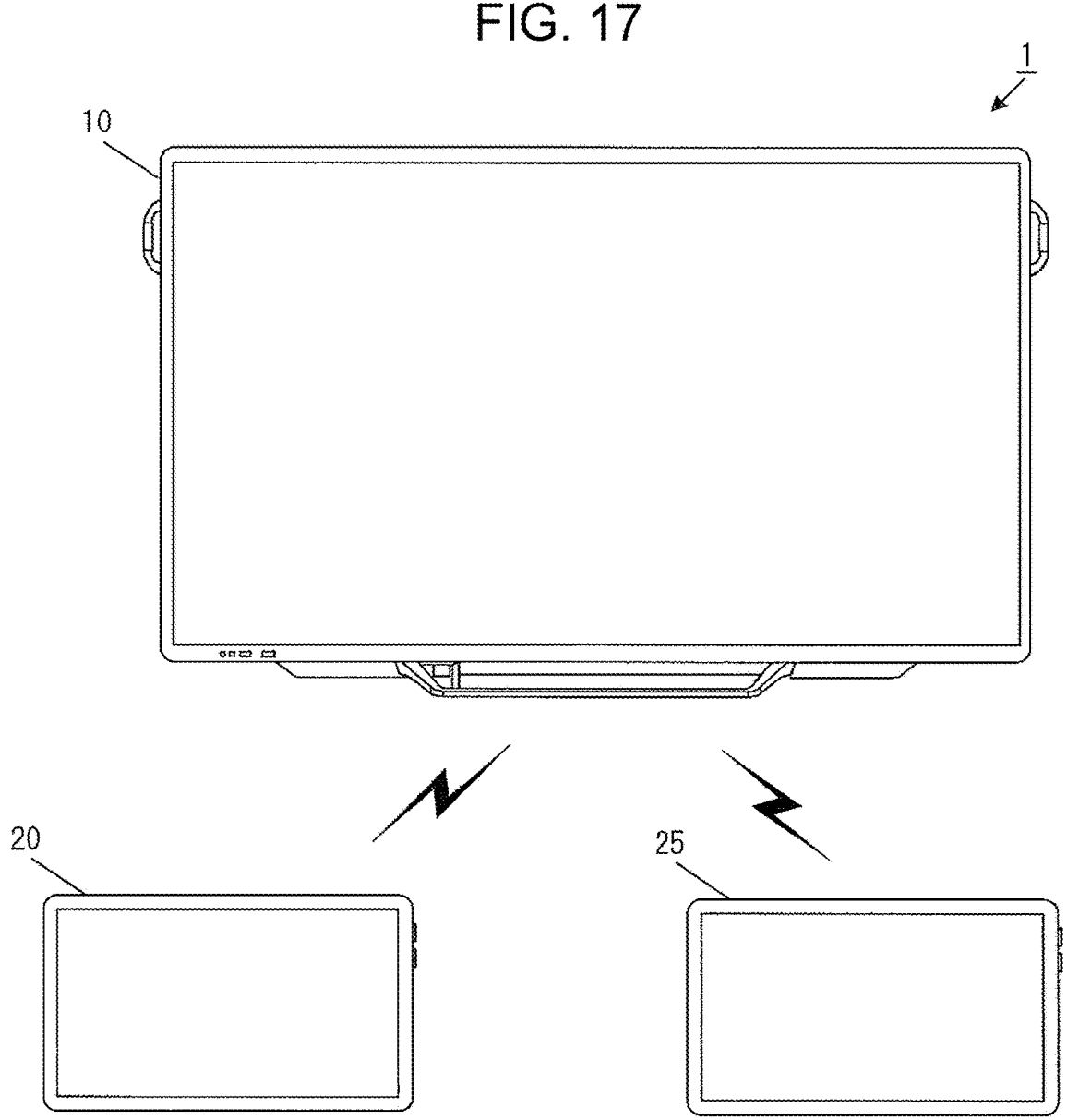
FIG. 17 is a diagram for describing the appearance of the entire system according to a sixth embodiment.
FIG. 18 is a diagram for describing shared folder information according to the sixth embodiment.

A sixth embodiment will be described. The sixth embodiment describes the case in which multiple terminal apparatuses are connected to the content delivery system. FIG. 17 is a diagram illustrating the entire content delivery system 1. The content delivery system 1 includes multiple terminal apparatuses, the terminal apparatus 20 and a terminal apparatus 25. That is, the sixth embodiment is made by adding another terminal apparatus to the embodiments described above.

The shared folder setting information 152 of the display apparatus 10 stores shared folders associated with the respective tunnel trays. As illustrated in FIG. 18, a tunnel tray (for example, the "tunnel tray A") is stored in association with shared folder information (for example, "\\server1\fd1\").

The terminal apparatuses set the respective shared folders. Thus, the display apparatus 10 may receive content from the terminal apparatuses. The functional configuration of the apparatuses and the process flows are similar to those according to the embodiments described above, and will not be described.

An exemplary operation made when the sixth embodiment is applied to the third embodiment will be described by referring to FIGS. 19A to 20D. FIGS. 19A to 20D are diagrams illustrating the states of the terminal apparatus 20, the display apparatus 10, and the terminal apparatus 25 from the left. FIGS. 19A to 19D are diagrams for describing an operation of transmitting content from the terminal apparatus 20 to the display apparatus 10.

A display screen W610 on the display apparatus 10 is illustrated in the middle; a display screen W620A on the terminal apparatus 20 is illustrated on the left; and a display screen W620B on the terminal apparatus 25 is illustrated on the right.

On the display screen W610 on the display apparatus 10, a tunnel tray T610A and a tunnel tray T610B are displayed. On the display screen W620A on the terminal apparatus 20, a tunnel tray T620A is displayed. On the display screen W620B on the terminal apparatus 25, a tunnel tray T620B is displayed.

The shared folder which is set to the tunnel tray T620A is the same as the shared folder which is set to the tunnel tray T610A. The shared folder which is set to the tunnel tray T620B is the same as the shared folder which is set to the tunnel tray T610B.

Figure 19A:
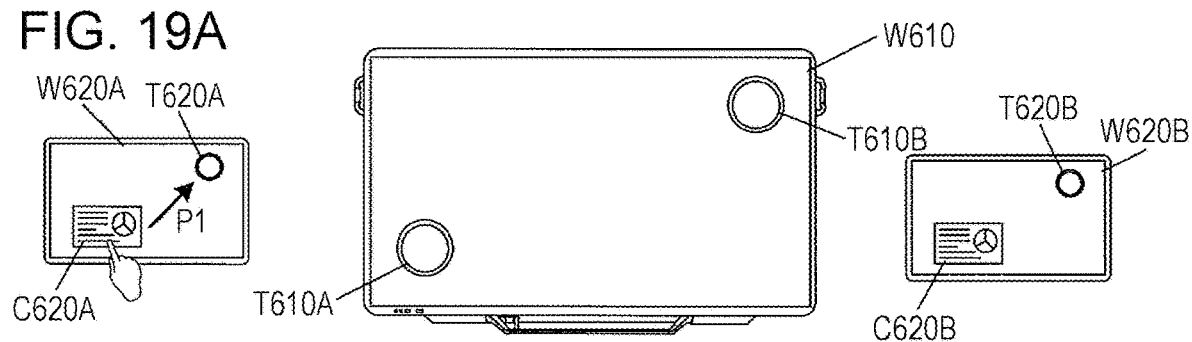
FIGS. 19A to 19D are diagrams for describing an exemplary operation according to the sixth embodiment.
Figure 19B:
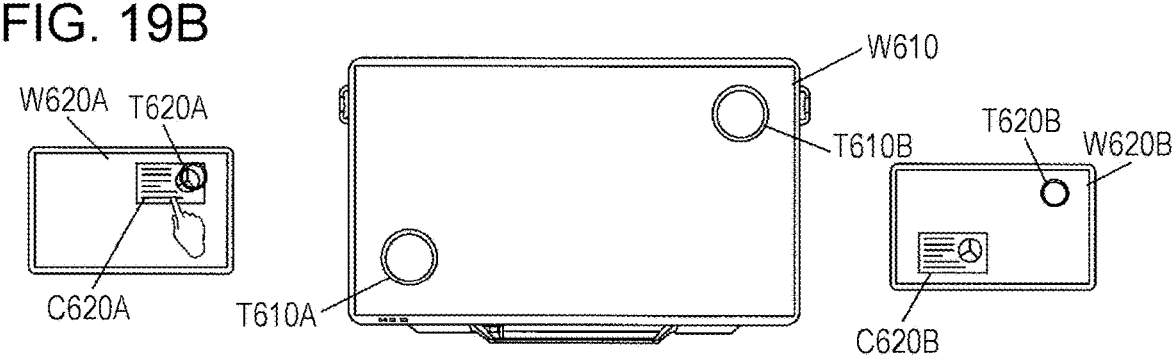

Therefore, on the terminal apparatus 20, a sheet C620A displayed on the display screen W620A is moved (for example, is dragged) in the direction P1 in which the tunnel tray T620A is displayed (in FIG. 19A). By dragging and dropping the sheet onto the tunnel tray T620A, the content corresponding to the sheet C620A may be copied to the shared folder (in FIG. 19B). That is, a drag and drop operation causes the state, in which the sheet C620A is superimposed on the tunnel tray T620A, to be displayed.

Figure 19C:
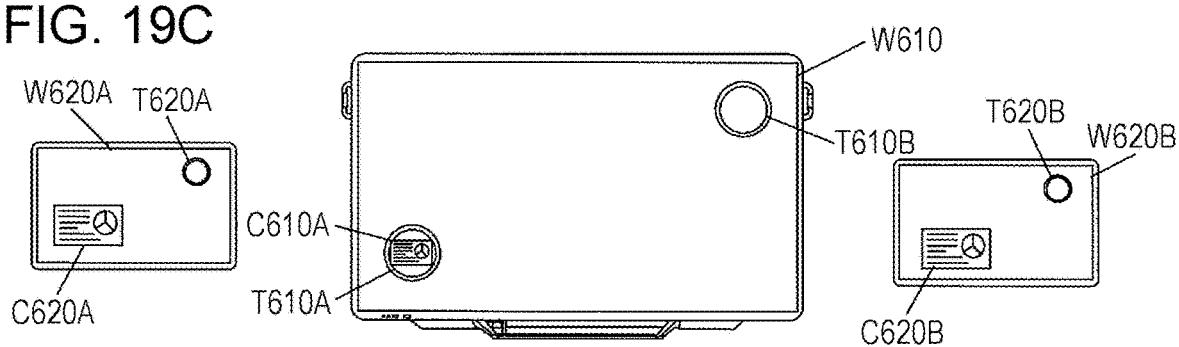
Figure 19D:
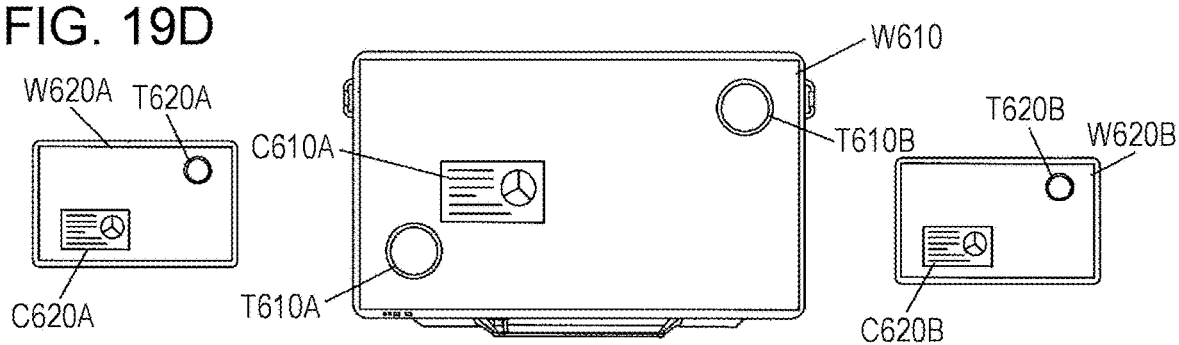

In the case where the shared folder has stored content and where the display apparatus 10 supports the content, the display apparatus 10 creates a sheet image when appropriate, copies the content, and displays a sheet C610A, which has been reduced in size, in the tunnel tray T610A (in FIG. 19C). The display of the sheet C610A is moved while being enlarged until the sheet C610A is located at the display position of the sheet C610A. Thus, the sheet C610A is displayed on the display screen W610 (in FIG. 19D). A similar operation may be performed on the terminal apparatus 25.

The tunnel tray on which a sheet is displayed may be discriminatively displayed, or information about the shared folder corresponding to the tunnel tray may be displayed. In addition, information about the terminal corresponding to the shared folder (for example, the terminal name, the user name, or the address) may be displayed as characters, a figure, an icon, or the like.

For example, FIGS. 20A to 20D are diagrams illustrating the state in which the corresponding tunnel tray is enlarged and displayed. On the terminal apparatus 25, a sheet C620B displayed on the display screen W620B is moved (for example, dragged) in the direction P2 in which the tunnel tray 620B is displayed (in FIG. 20A). By dragging and dropping the sheet onto the tunnel tray T620B, the content corresponding to the sheet C620B is copied to the shared folder (in FIG. 20B).

When the display apparatus 10 detects that the shared folder has stored content, the display apparatus 10 discriminatively displays the tunnel tray T610B. For example, in FIG. 20B, the tunnel tray T610B is displayed so as to be slightly larger than the normal display. Thus, predictive display is presented which indicates that a sheet will be displayed out of the tunnel tray T610B.

Figure 20A:
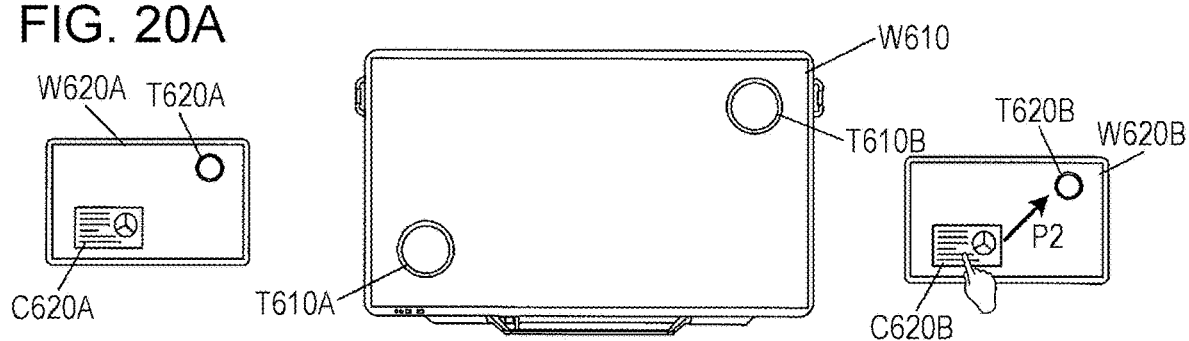
FIGS. 20A to 20D are diagrams for describing an exemplary operation according to the sixth embodiment.
Figure 20B:
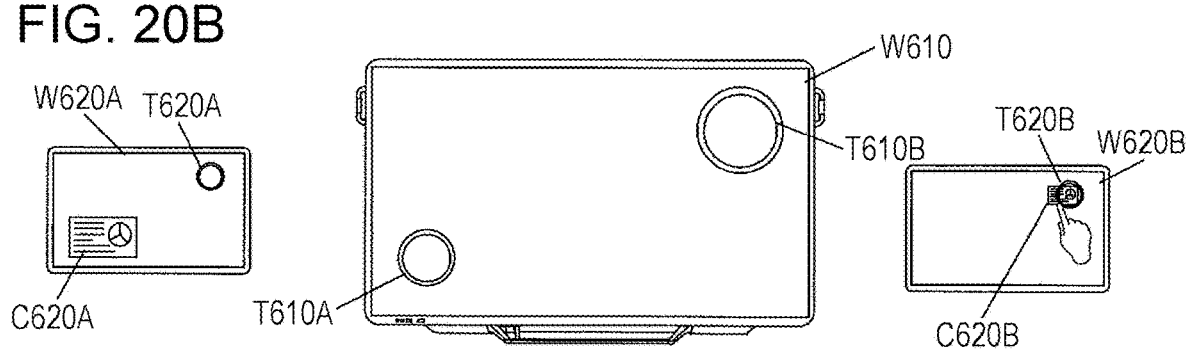
Figure 20C:
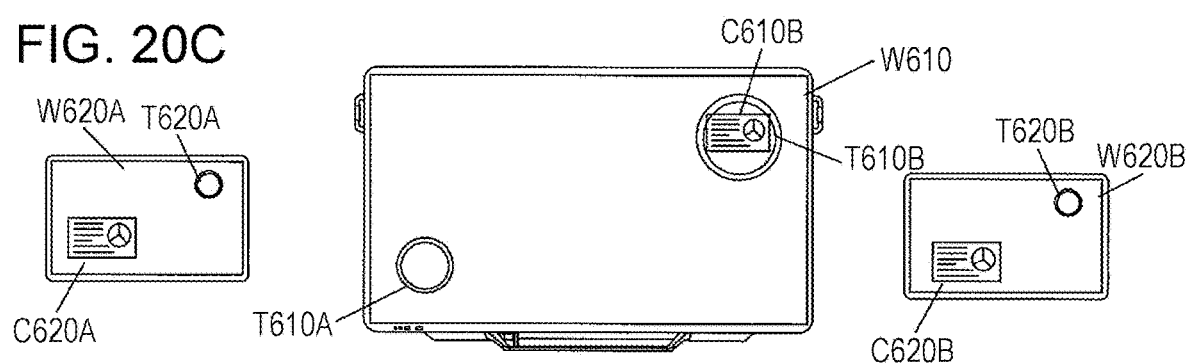
Figure 20D:
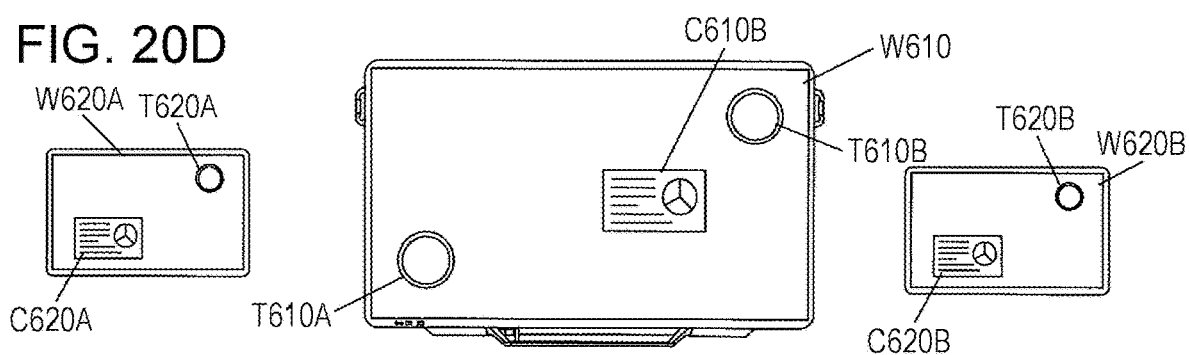

When the display apparatus 10 supports the content stored in the shared folder, the display apparatus 10 creates a sheet image when appropriate, copies the content, and displays a sheet C610B, which has been reduced in size, in the tunnel tray T610B (in FIG. 20C). The display of the sheet C610B is moved while being enlarged until the sheet C610B is located at the display position of the sheet C610B. Thus, the sheet C610B is displayed on the display screen W610 (in FIG. 20D).

Thus, according to the sixth embodiment, when multiple terminal apparatuses are connected to the content delivery system, the respective tunnel trays may be displayed. A user may recognize which terminal apparatus is transmitting content.

FIGS. 19A to 20D illustrate the operations from terminal apparatuses to the display apparatus. Alternatively, the display apparatus may serve as the transmission side, and a terminal apparatus may serve as the reception side. That is, in the sixth embodiment, the transmission-side processes in FIGS. 5 and 6 are performed by a terminal apparatus, and the reception-side process in FIG. 7 is performed by the display apparatus. As a matter of course, the processes may be performed conversely.

That is, a terminal apparatus and the display apparatus may be used to perform the processes in the bidirectional manner. Thus, content may be transmitted not only from a terminal apparatus to the display apparatus but also from the display apparatus to a terminal apparatus.

Seventh Embodiment

A seventh embodiment will be described. In the embodiments described above, the example in which tunnel trays are displayed on the terminal apparatus and the display apparatus, that is, the example in which a shared folder has been set, is described. In the seventh embodiment, an operation in which a tunnel tray is automatically added to the display apparatus when the terminal apparatus is connected to the content delivery system is described based on FIG. 21.

Figure 21:
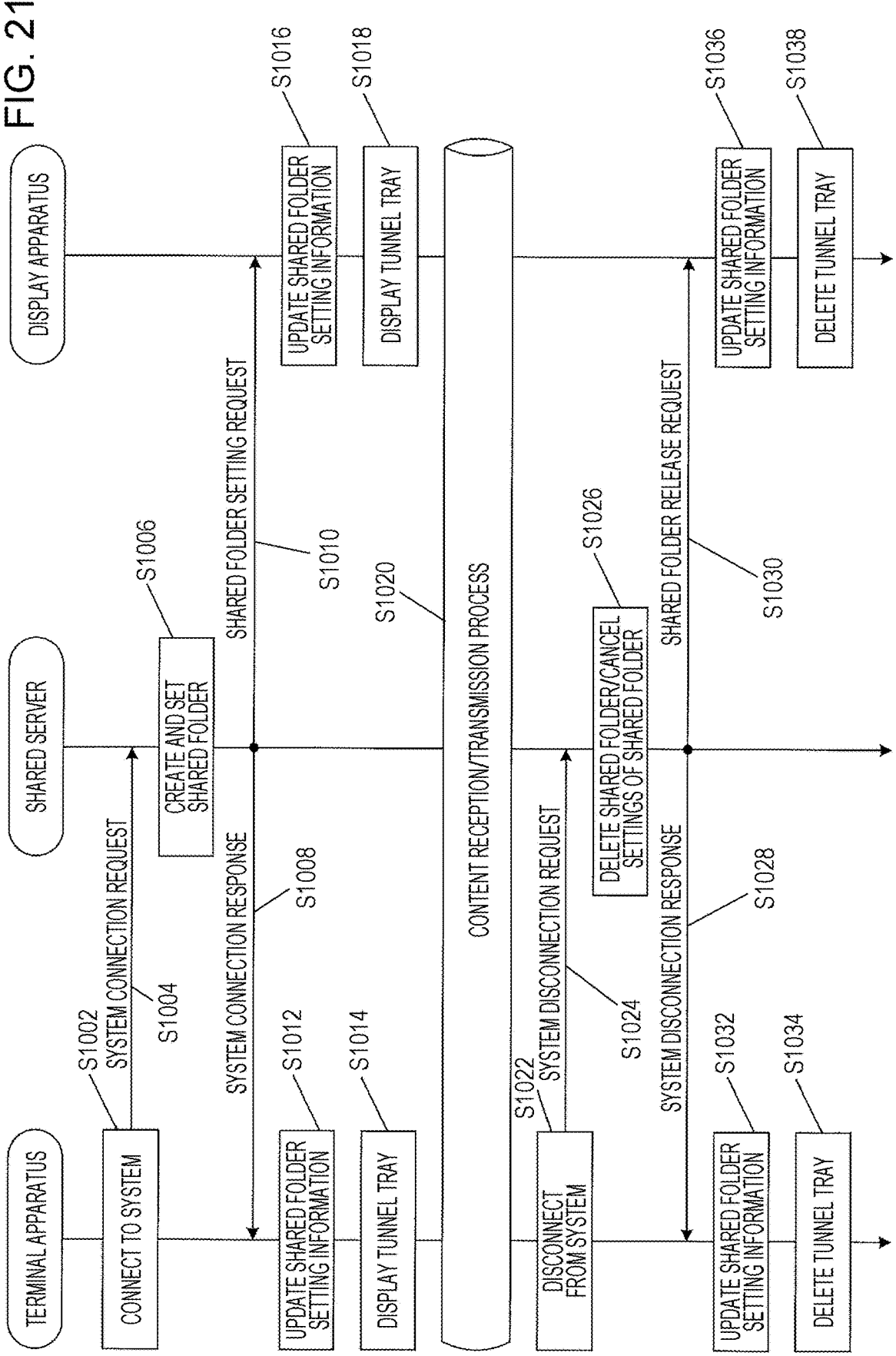
FIG. 21 is a sequence diagram for describing a process flow of the entire system according to a seventh embodiment.

That is, by performing the processes in FIG. 21, the tunnel trays described in the embodiments described above are created and displayed.

When the terminal apparatus 20 is to be connected to the content delivery system 1 (S1002), the terminal apparatus 20 transmits a system connection request to the shared server 30 (S1004).

When the shared server 30 receives the system connection request, the shared server 30 creates and sets a shared folder (S1006). The shared folder may be automatically created when a system connection request is received, or may be set to an already existing shared folder. When the system connection request includes information about the shared folder, the shared folder may be set by using the information.

When the shared server 30 sets the shared folder, the shared server 30 transmits a system connection response to the terminal apparatus 20 (S1008). Thus, the terminal apparatus 20 updates the shared folder setting information 252 (S1012), and displays a tunnel tray on the display screen (S1014).

After the shared server 30 sets the shared folder, the shared server 30 transmits a shared folder setting request to the display apparatus 10 (S1010). When the display apparatus 10 receives the shared folder setting request, the display apparatus 10 updates the shared folder setting information 152 (S1016), and displays a tunnel tray on the display screen (S1018).

Thus, the corresponding tunnel trays are displayed on the terminal apparatus 20 which serves as the transmission side and the display apparatus 10 which serves as the reception side. After that, the processes described in the embodiments described above are performed as the content reception/transmission process (S1020).

When the terminal apparatus 20 is to be disconnected from the system (S1022), the terminal apparatus 20 transmits a system disconnection request to the shared server 30 (S1024).

The shared server 30 cancels the settings of the shared folder (S1026). At that time, the shared server 30 may notify the terminal apparatus 20 and the display apparatus 10 of the cancellation in order to simply cancel the settings of the shared folder. Alternatively, the shared server 30 may delete the shared folder itself.

After the cancellation of the settings of the shared folder, the shared server 30 transmits a system disconnection response to the terminal apparatus 20 (S1028). When the terminal apparatus 20 receives the system disconnection response, the terminal apparatus 20 updates the shared folder setting information (S1032). That is, the terminal apparatus 20 deletes the settings of the shared folder from the shared folder setting information 252. The terminal apparatus 20 deletes the corresponding tunnel tray from the display screen (S1034).

After the shared server 30 cancels the settings of the shared folder, the shared server 30 transmits a shared folder release request to the display apparatus 10 (S1030). The display apparatus 10 having received the shared folder release request updates the shared folder setting information (S1036). That is, the display apparatus 10 deletes the settings of the shared folder from the shared folder setting information 152. The display apparatus 10 deletes the corresponding tunnel tray from the display screen (S1038).

Thus, according to the seventh embodiment, tunnel trays may be automatically displayed or deleted at a timing at which the terminal apparatus is connected/disconnected to/from the content delivery system. In the embodiment described above, a single terminal apparatus is described. As a matter of course, multiple terminal apparatuses may be connected.

Application Examples

Application of the content delivery system providing the embodiments described above may cause effective use in the following cases.

1. In the case where a table-type display apparatus is used as the terminal apparatus and where a vertically-oriented display apparatus is used as the display apparatus, opinions may be effectively exchanged and shared in an electronic conference or the like.

(1) People write their opinions on their memo sheets by using the terminal apparatus (table-type display apparatus).

(2) The memo sheets on which the opinions are written are displayed on the display apparatus (vertically-oriented display apparatus).

When it is considered that the process flow from (1) to (2) is to be smoothly performed, the related-art drawer, which is disposed on one of the sides, is not suitable. Instead of the drawer, the tunnel tray is disposed at the center in consideration of operations from the four sides that are characteristics of the table-type display, enhancing convenience for users.

2. A table-type display apparatus may be used as the terminal apparatus, which serves as a transmission source, in the lobby of a hotel. In this case, documents, content, and photographs may be easily shared.

(1) People display (transfer) photographs and moving images to the terminal apparatus (table-type display apparatus) which serves as a transmission source.

(2) A display apparatus (a smartphone of each person or a folder of an external storage server), which serves as a reception source, is set to a corresponding tunnel tray.

(3) A person inputs content, which the person wants, to the person's tunnel tray.

(4) A person inputs content, which a different person wants, to the different person's tunnel tray.

(5) A reception operation is performed to receive the content.

When it is considered that the process flow from (3) to (4) is to be smoothly performed, the content delivery system is effectively applied since the tunnel tray is movable.

3. The content delivery system may be used in a meeting. In this case, documents and content may be easily classified.

(1) Documents are displayed in a meeting on the terminal apparatus, which serves as a transmission source.

(2) In addition to the drawer of the related art, a "to-be-checked folder" is set to the tunnel tray.

(3) Sheets which are recognized as to-be-checked documents in the meeting are input to the tunnel tray.

(4) After the meeting, the participants check the to-be-checked documents at their desks.

By using the tunnel tray, specific documents are classified, for management, from a large number of documents, and the process flow from (3) to (4) may be smoothly performed. In this case, it is assume that a corresponding drawer of the related art is prepared and used for each meeting. For a different type of operation, such as an operation of "checking documents later", the tunnel tray may be used as a storage different from the drawer of the related art.

Modified Examples

The embodiments provided by the present disclosure are described above in detail by referring to the drawings. The specific configuration is not limited to the embodiments. Design and the like made without departing from the gist of the present disclosure are also encompassed in the claims.

In the embodiments described above, the example in which a touch panel is used as the operation detecting unit and in which a touch operation (tap operation) is performed is described. Alternatively, for example, an external input apparatus such as a mouse may be used to perform operations using a click operation and the like.

The embodiments describe the example in which a touch panel formed of the display unit 110 and the operation detecting unit 120 combined with each other is used. As a matter of course, to embody the present disclosure disclosed by using the embodiments, another scheme may be employed. For example, a projector may be used as the display unit 110, and a person detecting sensor may be used as the operation detecting unit 120. By connecting a control computer to the operation detecting unit 120 and the display unit 110, the content delivery system may be implemented as a display system.

For the sake of convenience of explanation, some of the embodiments described above are separately described. As a matter of course, some of the embodiments may be combined for implementation in a technically allowable range. For example, the operation according to the fifth embodiment may be combined with other embodiments for implementation.

Thus, the embodiments described in the specification may be combined with each other for implementation in a range in which no contradiction occurs.

Programs running in the apparatuses in the embodiments are programs for controlling a CPU and the like so that the above-described functions according to the embodiments are implemented (programs for causing a computer to function). Information used in these apparatuses is temporarily accumulated in a temporary storage (for example, a random-access memory (RAM)) during processing, and is then stored in various storage devices, such as a read-only memory (ROM), an HDD, and an SSD. When appropriate, the CPU reads, modifies, and writes the information.

When the programs are distributed in a market, the programs may be stored in a portable storage medium for distribution, or may be transferred to a server computer connected over a network such as the Internet. In this case, as a matter of course, the present disclosure encompasses a storage device of the server computer.

The present disclosure contains subject matter related to that disclosed in Japanese Priority Patent Application JP 2017-120699 filed in the Japan Patent Office on Jun. 20, 2017, the entire contents of which are hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. A content delivery system to which a content transmission apparatus and a content reception apparatus are connected, the content transmission apparatus comprising:
a transmission-side display unit that displays an image on a display screen of the content transmission apparatus, the image being created based on content,
an image selection unit that selects a selected image from the image,
an operation detection unit that detects a move operation on the selected image,
a move determination unit that determines whether or not the selected image has been moved to a predetermined transmission-side discriminative display displayed on the display screen of the content transmission apparatus,
an image changing unit that deletes an entirety of the selected image from the display screen of the content transmission apparatus or displays the entirety of the selected image only on another area other than the transmission-side discriminative display displayed on the display screen of the content transmission apparatus when the selected image has been moved to the transmission-side discriminative display, and
a content transmission unit that transmits content corresponding to the selected image to a storage area associated with the transmission-side discriminative display when the entirety of the selected image is deleted from the display screen of the content transmission apparatus or is displayed only on the another area other than the transmission-side discriminative display displayed by the image changing unit, the content reception apparatus comprising:
a content acquisition unit that acquires the content from the storage area, and
a reception-side display unit that displays an image on a display screen of the content reception apparatus, the image being created based on the acquired content, wherein the content reception apparatus is provided with a reception-side discriminative display displayed on the display screen of the content reception apparatus, wherein the reception-side display unit displays the image in the reception-side discriminative display, the image being reduced in size so as to be accommodated in the reception-side discriminative display, and then gradually enlarges the displayed image, wherein the content acquisition unit displays a message on the display screen of the content reception apparatus when a content not supported by the content reception apparatus is stored in the storage area, wherein the reception-side display unit displays an icon on the reception-side discriminative display to identify the content not supported by the content reception apparatus when the content not supported by the content reception apparatus is received, and wherein the icon is moved from the reception-side discriminative display to an area of the display screen of the content reception apparatus other than the reception-side discriminative display.

2. The content delivery system according to claim 1,
wherein the content transmission apparatus and the content reception apparatus are connected to a server, and
wherein the storage area is a shared folder that is set in the server.

3. The content delivery system according to claim 1,
wherein the storage area is a shared folder which is set in the content transmission apparatus or the content reception apparatus.

4. The content delivery system according to claim 1,
wherein the content acquisition unit acquires a plurality of pieces of content from the storage area,
wherein the reception-side display unit displays an image representing a set of images, the image being created based on the plurality of pieces of content, the image being displayed so as to be accommodated in the reception-side discriminative display, and
wherein, in a case where the displayed image is gradually enlarged, the reception-side display unit sequentially changes the display form of each image included in the set of images.

5. The content delivery system according to claim 1,
wherein, in the content reception apparatus, the content acquisition unit acquires content other than content having been displayed on the display screen of the content reception apparatus, the acquired content being among content stored in the storage area.

6. The content delivery system according to claim 5,
wherein a plurality of content transmission apparatuses are connected to the content delivery system,
wherein a corresponding storage area is assigned to each of the plurality of content transmission apparatuses, the content transmission apparatus transmitting content to the storage area,
wherein the reception-side discriminative displays are associated with the respective storage areas, and
wherein the reception-side display unit displays the image in the reception-side discriminative display corresponding to the storage area for the acquired content.

7. The content delivery system according to claim 6,
wherein, when a connection is established between the content transmission apparatus and the content delivery system, the content reception apparatus prepares the reception-side discriminative display.

8. A content reception apparatus connected to the content delivery system according to claim 1.

9. A content delivery method for a content delivery system to which a content transmission apparatus and a content reception apparatus are connected, the method comprising:
by using the content transmission apparatus,
displaying an image on a display screen, the image being created based on content;
selecting a selected image from the image;
detecting a move operation on the selected image;
determining whether or not the selected image has been moved to a predetermined transmission-side discriminative display displayed on the display screen;
deleting an entirety of the selected image from the display screen or displaying the entirety of the selected image only on another area other than the transmission-side discriminative display displayed on the display screen when the selected image has been moved to the transmission-side discriminative display displayed on the display screen;
transmitting content corresponding to the selected image to a storage area associated with the transmission-side discriminative display displayed on the display screen when the entirety of the selected image is deleted from the display screen or is displayed only on the another area other than the transmission-side discriminative display displayed on the display screen;
by using the content reception apparatus,
acquiring the content from the storage area;
providing a reception-side discriminative display displayed on the display screen of the content reception apparatus;
displaying an image on a display screen of the content reception apparatus, the image being created based on the acquired content and the image being reduced in size so as to be accommodated in the reception-side discriminative display, and then gradually enlarging the displayed image;
displaying a message on the display screen of the content reception apparatus when a content not supported by the content reception apparatus is stored in the storage area; and
displaying an icon on the reception-side discriminative display to identify the content not supported by the content reception apparatus when the content not supported by the content reception apparatus is received,
wherein the icon is moved from the reception-side discriminative display to an area of the display screen of the content reception apparatus other than the reception-side discriminative display.

10. The content delivery system according to claim 1,
wherein the transmission-side discriminative display is displayed as a circle on the display screen of the content transmission apparatus.

11. The content delivery system according to claim 1,
wherein a position, a size, and a color of the transmission-side discriminative display on the display screen of the content transmission apparatus is set by a user.

* * * * *